(12) United States Patent
Hara

(10) Patent No.: US 7,853,047 B2
(45) Date of Patent: Dec. 14, 2010

(54) SYSTEM FOR RECOGNIZING FINGERPRINT IMAGE, METHOD AND PROGRAM FOR THE SAME

(75) Inventor: Masanori Hara, Tokyo (JP)

(73) Assignee: NEC Corporation, Tokyo (JP)

( * ) Notice: Subject to any disclaimer, the term of this patent is extended or adjusted under 35 U.S.C. 154(b) by 1131 days.

(21) Appl. No.: 11/500,467

(22) Filed: Aug. 8, 2006

(65) Prior Publication Data

US 2007/0036401 A1 Feb. 15, 2007

(30) Foreign Application Priority Data

Aug. 9, 2005 (JP) ............................. 2005-231150

(51) Int. Cl.
*G06K 9/00* (2006.01)
*G06K 9/40* (2006.01)

(52) U.S. Cl. ...................................... 382/116; 382/254

(58) Field of Classification Search ................. 382/124, 382/116
See application file for complete search history.

(56) References Cited

U.S. PATENT DOCUMENTS

| | | | |
|---|---|---|---|
| 3,893,080 A | | 7/1975 | Ho et al. |
| 4,015,240 A | | 3/1977 | Swonger et al. |
| 4,156,230 A | | 5/1979 | Riganati et al. |
| 4,310,827 A | * | 1/1982 | Asai ............................ 382/125 |
| 5,963,656 A | * | 10/1999 | Bolle et al. .................. 382/124 |
| 6,072,895 A | | 6/2000 | Bolle et al. |
| 6,111,978 A | | 8/2000 | Bolle et al. |
| 7,116,806 B2 | * | 10/2006 | Werthiem et al. ............ 382/124 |

FOREIGN PATENT DOCUMENTS

| | | |
|---|---|---|
| JP | 59-778 A | 1/1984 |
| JP | 62-118488 A | 5/1987 |
| JP | 1-213757 A | 8/1989 |
| JP | 5-189546 A | 7/1993 |
| JP | 5-205035 A | 8/1993 |
| JP | 6-176137 A | 6/1994 |
| JP | 8-287255 A | 11/1996 |
| JP | 11-249004 A | 9/1999 |
| JP | 2001-14464 A | 1/2001 |
| JP | 2001-243467 A | 9/2001 |
| JP | 2002-208015 A | 7/2002 |
| WO | WO 95/32482 A1 | 11/1995 |

OTHER PUBLICATIONS

Farina A, et al: Fingerprint minutiae extraction from skeletonized binary images Pattern Recognition, Elsevier, Kidlington, GB, vol. 32 No. 5, May 1999, pp. 877-889, X004222753 ISSN: 0031-3203 Section 2.4. "Minutiae invalidation", Section 2.5. "Topological validation" Fig. 3-15.

* cited by examiner

Primary Examiner—Bhavesh M Mehta
Assistant Examiner—Hadi Akhavannik
(74) Attorney, Agent, or Firm—Sughrue Mion, PLLC

(57) ABSTRACT

A fingerprint recognition system for extracting minutiae from a fingerprint image. The fingerprint recognition system generates a corrected image from the input fingerprint image by: eliminating incipient ridges/pores from the fingerprint image by using the density pattern of the pixels of ridge lines/valley lines in the direction orthogonal to the length direction of the ridge lines. The minutiae are extracted from the corrected image.

8 Claims, 28 Drawing Sheets

Fig. 11

EXAMPLE OF MASK IN
DIRECTION ZERO

EXAMPLE OF MASK IN
DIRECTION 1/8 π

EXAMPLE OF MASK IN
DIRECTION 1/4 π

SYSTEM FOR RECOGNIZING FINGERPRINT IMAGE, METHOD AND PROGRAM FOR THE SAME

BACKGROUND OF THE INVENTION

1. Field of the Invention

The present invention relates to the recognition of a fingerprint image.

2. Description of the Related Art

Conventionally, in a fingerprint matching, as a fingerprint matching apparatus noted in Japanese Laid Open Patent Application (JP-A-Showa, 59-778) or in its US patent family U.S. Pat. No. 4,646,352, a minutia matching has been widely used by using the end point and bifurcation of a fingerprint ridge (either of them is referred to as a common word "minutia").

In the conventional technique, it is difficult to accurately distinguish minutiae from incipient ridge lines and sweat pores. The "incipient ridge line" means the growing line that does hot become the ridge perfectly.

As one of the conventional techniques for processing a low quality fingerprint image containing a noise, Japanese Laid Open Patent Application (JP-A-Heisei, 8-287255) or its US patent family U.S. Pat. No. 6,018,586 discloses an apparatus and an image processor for extracting image features of a skin pattern.

The apparatus of this conventional technique includes an image feature extracting apparatus of a skin pattern image for extracting an image feature in a plurality of local regions set on an image in advance. The image feature extracting apparatus has an image memory, a group of filters memory, an image magnitude calculator and a feature calculator.

The image memory stores a skin pattern image. The group of filters memory stores a plurality of filters composed of a two-dimensional array of weighting factors to extract the image features in the local regions. The filtering means filters the skin pattern images stored in the image memory by using the plurality of filters stored in the group of filters memory, respectively. The image magnitude calculator calculates the image magnitudes in the plurality of local regions set on the images in advance, for the respective images obtained by the filtering device. The feature calculator uses the information of the image magnitudes of the local regions which are obtained by the image magnitude calculator and then calculates the image features in the respective local regions.

According to the method proposed in the Japanese Laid Open Patent Application (JP-A-Heisei, 8-287255) or in its US patent family U.S. Pat. No. 6,018,586, the plurality of two-dimensional filters having the weighting factors, which correspond to the image features of ridge directions and ridge pitches are prepared in advance, and the filters are used to carry out a filter enhancement. Then, the result of the filtering process having the maximum image magnitude is selected, thereby executing the effective image enhancement and also extracting the ridge direction and ridge pitch, which correspond to the selected filter, as the image feature. Consequently, the noise is removed.

Also, although the conventional techniques for removing the sweat pores from the fingerprint image have been variously proposed, most of them use the supposition that the sweat pore is surrounded with ridge pixels. For example, Japanese Laid Open Patent Application (JP-A-Heisei, 5-205035) discloses a fingerprint matching apparatus.

This fingerprint matching apparatus is provided with a fingerprint sensor, a fingerprint image memory, a gray-scale image corrector and a main body device.

The fingerprint sensor scans a fingerprint image. The fingerprint image memory temporally stores a fingerprint image data read by the fingerprint sensor. The gray-scale image corrector calculates a contour line of the gray-scale image of the fingerprint from the fingerprint image stored in the fingerprint image memory. Then, false minutiae, such as an island, a bridge, a sweat pore or the like are extracted from the image constituted by the contour lines, and if the minutia is the island or bridge, the density of the portion corresponding to a closed curve surrounded with those contour lines is decreased. On the other hand, if those minutiae are the sweat pores, the density of the portion corresponding to the closed curve surrounded with those contour lines is increased and the false minutiae are removed from the gray-scale image.

As another conventional technique, Japanese Laid Open Patent Application (JP-P2001-14464A) discloses an apparatus for fingerprint image processing and the method for the same. This technique has a filtering means for eliminating sweat pores from a fingerprint image.

As still another conventional technique, Laid Open Patent Application (JP-P2001-243467A) discloses a sweat pore portion judging apparatus. This technique has an algorism for distinguishing sweat pores from islands by using the direction of ridge line.

As yet still another conventional technique, Japanese Laid Open Patent Application (JP-A-Heisei, 1-213757) discloses a sweat pore eliminating processing apparatus.

SUMMARY OF THE INVENTION

In the conventional noise reduction technique disclosed in already mentioned Japanese Laid Open Patent Application (JP-A-Heisei, 8-287255) or its US patent family U.S. Pat. No. 6,018,586, when the incipient ridges or sweat pores are thick, there is a possibility that false ridges are extracted. For example, in an example of a fingerprint image where the incipient ridge lines and the sweat pores are thick as shown on the left side picture of FIG. 12 and the left side picture of FIG. 21, many incipient ridge lines and the sweat pores exist. If the filter corresponding to the case where the ridge pitch is half of the ideal value is used to execute the filter enhancement, the image magnitude becomes maximum. In this case, as shown on the right side of FIG. 12 and the right side of FIG. 21, two ridges are extracted from a region where only one ridge should be extracted.

The fingerprint comparing apparatus disclosed in already mentioned Japanese Laid Open Patent Application (JP-A-Heisei, 5-205035) proposes the method of extracting the contour line where the density of the gray-scale image is used, and regarding the pixel surrounded with the contour line having the shape of a loop as the sweat pore and then correcting the gray-scale image and consequently removing the sweat pore. In such a method, when there is the noise in the ridge pixels surrounding the sweat pore and the sweat pore is not surrounded with the closed curve, the sweat pore is not extracted.

A method that makes it possible to stably recognize and remove the incipient ridge line and the sweat pore even for the fingerprint image where the incipient ridge lines and the sweat pores are thick is desired.

It is therefore an object of the present invention to provide a system, a method and a program for recognizing a fingerprint image, which make it possible to stably recognize and remove the incipient ridge line and the sweat pore even for the fingerprint image where the incipient ridge lines and the sweat pores are thick.

To achieve the object, the fingerprint recognition system according to the present invention generates a corrected image from the input fingerprint image by: eliminating incipient ridges/pores from the fingerprint image by using the density pattern of the pixels of ridge lines/valley lines in the direction crossing to (or intersecting with) the longitudinal direction of the ridge lines. The minutiae are extracted from the corrected image.

More precisely, as one aspect of the present invention, a method for recognizing a fingerprint image includes: extracting a longitudinal direction of a ridge from the fingerprint image; classifying a plurality of ridges into true ridges and incipient ridges based on an analysis of an incipient feature pattern of the plurality of ridges in a direction crossing to the longitudinal direction; and generating a corrected image data by approximating densities of pixels classified as the incipient ridges close to a density of a valley of the fingerprint image. The minutiae are extracted from the corrected image.

Preferably, the method according to the present invention further includes: extracting an area extending in the longitudinal direction in which an occupancy rate of the true ridges is higher than a predetermined condition as a ridge area; and accentuating the ridge area.

As an another aspect of the present invention, a method for recognizing a fingerprint image includes: extracting a longitudinal direction of a ridge from the fingerprint image; classifying a plurality of valleys into true valleys and pores based on an analysis of a pore feature pattern of the plurality of valleys in a direction crossing to the longitudinal direction; and generating a corrected image data by approximating densities of pixels classified into the pores close to a density of a ridge of the fingerprint image.

Preferably, the method according to the present invention further includes: extracting an area extending in the longitudinal direction in which an occupancy rate of the true valley is higher than a predetermined condition as a valley area; and accentuating the valley area.

The system for recognizing a fingerprint image according to the present invention includes units, each of the units carries out the operational steps included in the method according to the present invention.

The computer readable software product for executing a recognition of a fingerprint image according to the present invention is read by a computer, and when executed, it causes the computer to execute the method according to the present invention.

By executing the system, method, or the program for recognizing the fingerprint image according to the present invention, it is possible to realize at least one of the following effects.

As the first effect, for the fingerprint image having the thick incipient ridge lines, the method of extracting the incipient ridge features, analyzing the properties of some incipient ridges in the direction orthogonal to the ridge lines and judging the pattern of the incipient ridge features which are alternately changed between the true ridge lines and the incipient ridge lines in accordance with the predetermined conditional equation makes it possible to accurately extract and remove the incipient ridge lines.

As the second effect, for the fingerprint image having the thick sweat pores, the method of extracting the sweat pore features and analyzing the sweat pore features of some valley lines in the direction orthogonal to the ridge line and then judging the pattern of the sweat pore features which are alternately changed between the true valley lines and the sweat pores in accordance with the predetermined conditional equation makes it possible to accurately extract and remove the sweat pores.

As the third effect, for the fingerprint image without any thick incipient ridge line, the method of extracting the incipient ridge features and analyzing the incipient ridge features of some ridges in the direction orthogonal to the ridge and then judging that there is no significant difference between all of the incipient ridge features in accordance with the predetermined conditional equation makes it possible to accurately extract and enhance the ridges.

As the fourth effect, for the fingerprint image without any thick sweat pore, the method of extracting the sweat pore features, and analyzing the sweat pore features of some valley lines in the direction orthogonal to the ridge and then judging that there is no significant difference between all of the sweat pore features in accordance with the predetermined conditional equation makes it possible to accurately extract and enhance the valley lines.

As the fifth effect, by using the ridge width as the incipient ridge feature, the incipient ridge lines can be accurately extracted.

As the sixth effect, by using the ridge direction density as the incipient ridge feature, the incipient ridge lines can be accurately extracted.

As the seventh effect, by using the ridge direction density as the sweat pore feature, the sweat pores can be accurately extracted.

As the eighth effect, by using the accumulated difference of the density as the sweat pore feature, the sweat pore can be accurately extracted.

As the ninth effect, by using the white pixel radius as the sweat pore feature, the sweat pore can be accurately extracted.

BRIEF DESCRIPTION OF THE DRAWINGS

FIG. 11 is a view showing an example of a ridge enhancing mask;

DESCRIPTION OF THE PREFERRED EMBODIMENTS

A first embodiment of the present invention will be described below with reference to the attached drawings.

Figure 1:
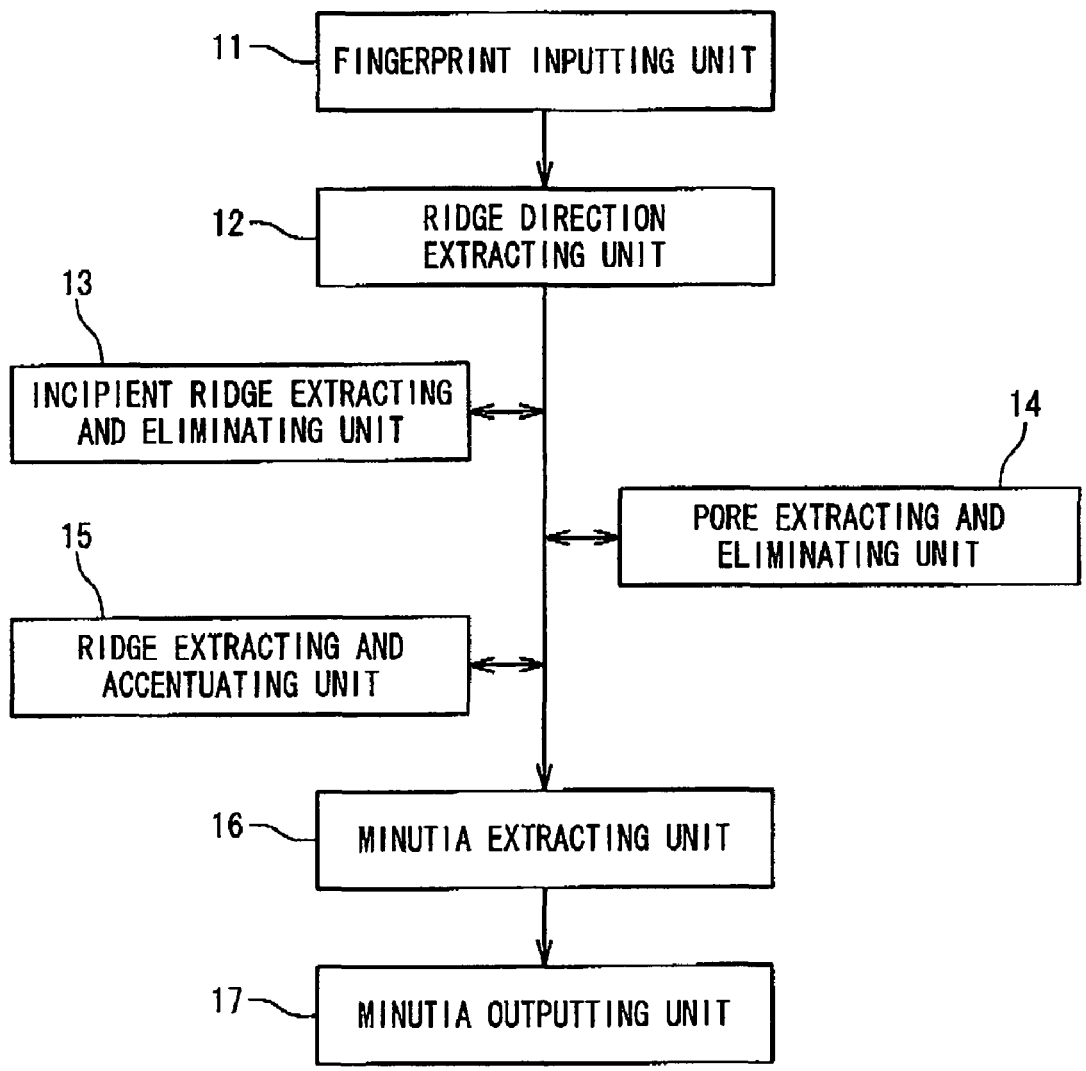
FIG. 1 is a block diagram showing an overall view of the embodiment of the present invention.

As shown in FIG. 1, the overall configuration of the present first embodiment is provided with a fingerprint image inputting unit 11, a ridge direction extracting unit 12, an incipient ridge extracting and eliminating unit 13, a pore extracting and eliminating unit 14, a ridge extracting and accentuating unit 15, a minutia extracting unit 16 and a minutia outputting unit 17.

The fingerprint image inputting unit 11 inputs and digitizes a fingerprint image scanned by a fingerprint sensor or scanner. The ridge direction extracting unit 12 extracts the direction of a ridge line from the fingerprint image inputted by the fingerprint image inputting unit 11. The incipient ridge extracting and eliminating unit 13 extracts and eliminates an incipient ridge line from the fingerprint image inputted from the fingerprint image inputting unit 11 by using the direction data extracted by the ridge direction extracting unit 12. The pore extracting and eliminating unit 14 extracts and eliminates a sweat pore from the fingerprint image inputted from the fingerprint image inputting unit 11 by using the direction data extracted by the ridge direction extracting unit 12. The ridge extracting and accentuating unit 15 extracts the ridge and valley from the fingerprint image inputted from the fingerprint image inputting unit by using the ridge direction data extracted by the ridge direction extracting unit 12 and enhances the densities of the ridge and the valley. The minutia extracting unit 16 extracts the minutiae from the fingerprint image where the incipient ridge lines are removed by the incipient ridge extracting and eliminating unit 13, the sweat pores are removed by the pore extracting and eliminating unit 14, and the ridge and valley line densities are enhanced by the ridge extracting and accentuating unit 15. The minutia outputting unit 17 outputs the minutia data extracted by the minutia extracting unit 17.

Figure 2:
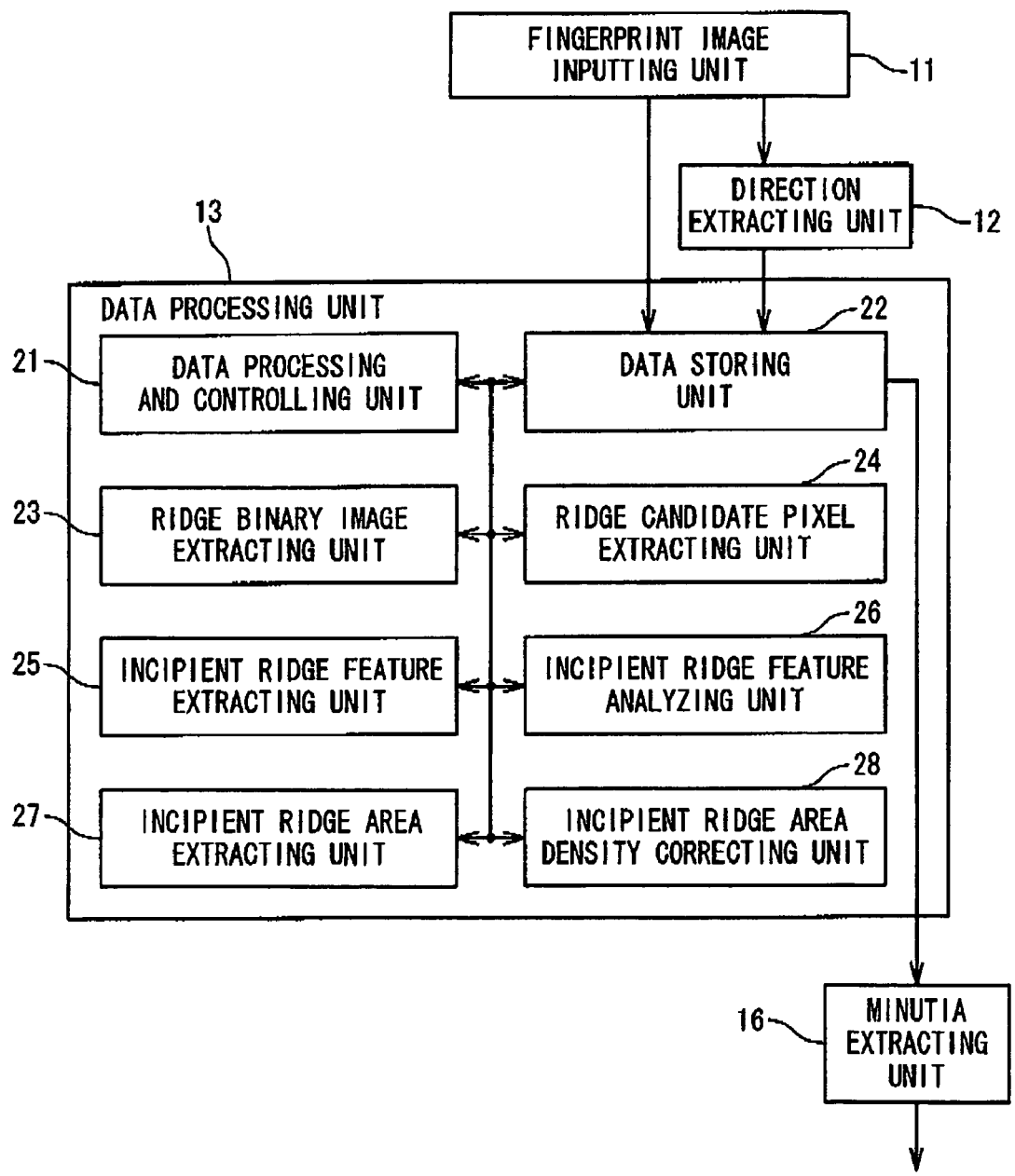
FIG. 2 is a configuration view of an incipient ridge line extracting and eliminating unit.

The first feature of this embodiment lies in the configuration of the incipient ridge extracting and eliminating unit 13 as shown in FIG. 2.

In FIG. 2, the incipient ridge extracting and eliminating unit 13 (also called as "data processing unit 13") contains a data processing and controlling unit 21, a data storing unit 22, a ridge binary image extracting unit 23, a ridge candidate pixel extracting unit 24, an incipient ridge feature extracting unit 25, an incipient ridge feature analyzing unit 26 (which is called also as a first false feature analyzing unit), an incipient ridge area extracting unit 27 and an incipient ridge area density correcting unit 28 and also has an interface with the minutia extracting unit 16.

The data processing and controlling unit 21 carries out the overall operation control of the incipient ridge extracting and eliminating unit 13. The data storing unit 22 stores the various data obtained in the respective units in the incipient ridge extracting and eliminating unit 13. The ridge binary image extracting unit 23 extracts a binary image in which a ridge portion is represented by "1" and a valley portion by "0". The ridge candidate pixel extracting unit 24 converts the ridge binary image into a skeleton and consequently extracts a group of pixels which is treated as the candidate of a ridge line. The incipient ridge feature extracting unit 25 extracts the incipient ridge feature for each pixel of the ridge candidate pixel group. The incipient ridge feature analyzing unit 26 (which is called also as "first false feature analyzing unit". Here, the "false feature" means the incipient ridge, which should be eliminated in extracting minutiae) analyzes the incipient ridge feature extracted for the ridge candidate pixel group. The incipient ridge area extracting unit 27 analyzes the ridge candidate pixel group to which a true-ridge mark or incipient-ridge-line mark is assigned and extracts the incipient ridge area. The incipient ridge area density correcting unit 28 corrects the density value for the pixel group, which is defined as the incipient ridge area, and consequently extracts the image in which the incipient ridge line is eliminated.

Figure 3:
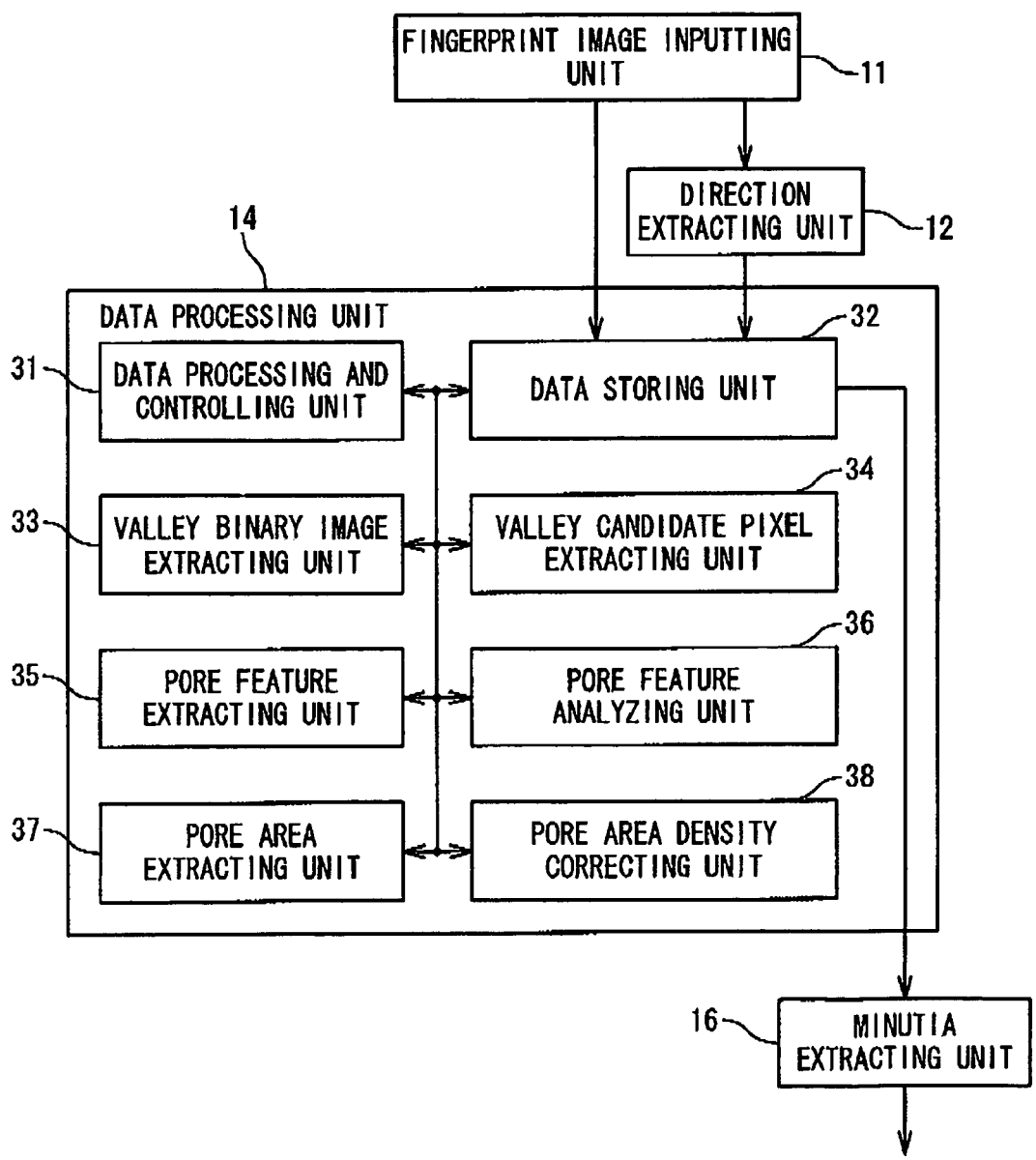
FIG. 3 is a configuration view of a sweat pore extracting and eliminating unit.

The second feature of this embodiment lies in the configuration of the pore extracting and eliminating unit 14 as shown in FIG. 3.

In FIG. 3, the pore extracting and eliminating unit 14 (also called as "data processing unit") contains a data processing and controlling unit 31, a data storing unit 32, a valley binary image extracting unit 33, a valley candidate pixel extracting unit 34, a pore feature extracting unit 35, a pore feature analyzing unit 36 (which is called also as a second false feature analyzing unit), a pore area extracting unit 37 and a pore area density correcting unit 38 and also has the interface with the minutia extracting unit 16.

The data processing and controlling unit 31 carries out the overall operation control of the pore extracting and eliminating unit 14. The data storing unit 32 stores the various data obtained in the respective units in the pore extracting and eliminating unit 14. The valley binary image extracting unit 33 extracts a binary image in which a valley portion is represented by "1" and a ridge portion by "0". The valley candidate pixel extracting unit 34 converts the valley line binary image into a skeleton and consequently extracts a group of pixels which is treated as the candidate of a valley line. The pore feature extracting unit 35 extracts the sweat pore feature for each pixel in the valley candidate pixel group. The pore feature analyzing unit 36 (which is called also as "second false feature analyzing unit". Here, the "false feature" means the sweat pore, which should be eliminated in extracting minutiae) analyzes the sweat pore feature extracted for the valley candidate pixel group. The pore area extracting unit 37 analyzes the valley candidate pixel group to which a true-valley mark or sweat-pore mark is assigned and extracts the sweat pore area. The pore area density correcting unit 38 corrects the density value for the pixel group, which is defined as the sweat pore area, and consequently extracts the image in which the sweat pore is eliminated.

Figure 4:
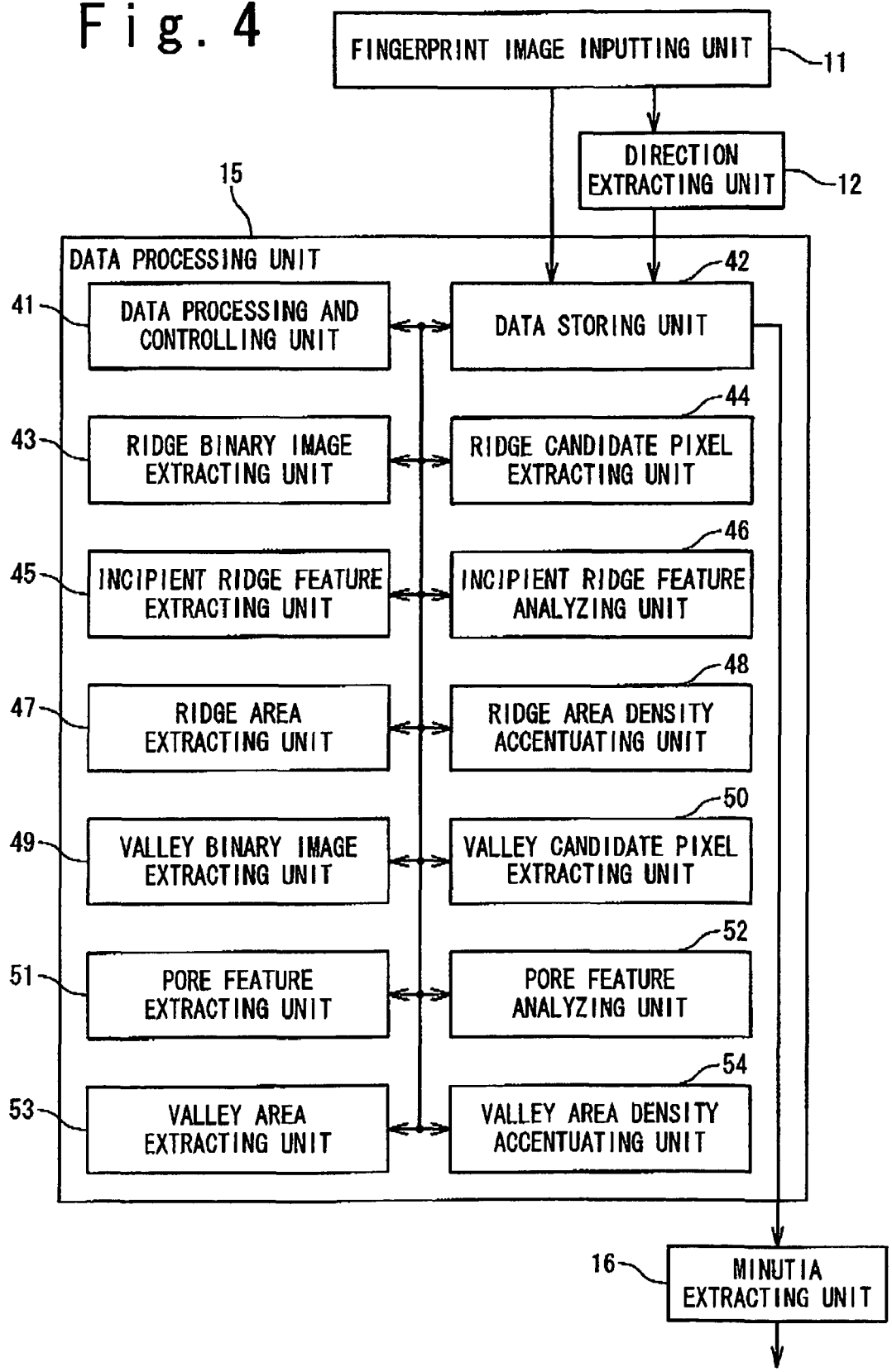
FIG. 4 is a configuration view of a ridge extracting and accentuating unit.

The third feature of this embodiment lies in the configuration of the ridge extracting and accentuating unit 15 as shown in FIG. 4.

In FIG. 4, the ridge extracting and accentuating unit 15 (also called as "data processing unit") contains a data processing and controlling unit 41, a data storing unit 42, a ridge binary image extracting unit 43, a ridge candidate pixel extracting unit 44, an incipient ridge feature extracting unit 45, an incipient ridge feature analyzing unit 46, a ridge area extracting unit 47 (which is called also as a third false feature analyzing unit), a ridge area density correcting unit 48, a valley binary image extracting unit 49, a valley candidate pixel extracting unit 50, a pore feature extracting unit 51, a pore feature analyzing unit 52, a valley area extracting unit 53 (which is called also as a fourth false feature analyzing unit) and a valley area density accentuating unit 54 and also has the interface with the minutia extracting unit 16.

The data processing and controlling unit 41 carries out the overall operation control of the ridge extracting and accentuating unit 15. The data storing unit 42 stores the various data obtained in the respective units in the ridge extracting and accentuating unit 15. The ridge binary image extracting unit 43 extracts a binary image in which a ridge portion is represented by "1" and the valley portion by "0". The ridge candidate pixel extracting unit 44 converts the ridge binary image into a skeleton and consequently extracts a group of pixels which is treated as the candidate of a ridge line. The incipient ridge feature extracting unit 45 extracts the incipient ridge feature for each pixel in the ridge candidate pixel group. The incipient ridge feature analyzing unit 46 analyzes the incipient ridge feature extracted for the ridge candidate pixel group. The ridge area extracting unit 47 analyzes the ridge candidate pixel group to which a true-ridge mark is assigned and extracts the ridge area. The ridge area density emphasizing unit 48 corrects a density value for the pixel group, which is defined as the ridge area, and consequently extracts the image where the ridge and the valley line are enhanced. The valley binary image extracting unit 49 extracts a binary image in which a valley portion is represented by "1" and the ridge portion by "0". The valley candidate pixel extracting unit 50 converts the valley line binary image into a skeleton and consequently extracts a group of pixels which is treated as the candidate of a valley line. The pore feature extracting unit 51 extracts the sweat pore feature for each pixel in the valley candidate pixel group. The pore feature analyzing unit 52 analyzes the sweat pore feature extracted for the valley candidate pixel group. The valley area extracting unit 53 analyzes the valley candidate pixel group to which the true-valley mark is assigned and extracts the valley area. The valley area density accentuating unit 54 corrects the. density value for the pixel group defined as the valley line area and consequently extracts the image where the ridge and the valley are enhanced.

The overall operations of this embodiment will be described below in detail with reference to the configuration view of FIG. 1, the entire flowchart of FIG. 5 and the related drawings in FIGS. 7 to 10.

(1) Step S1

Figure 5:
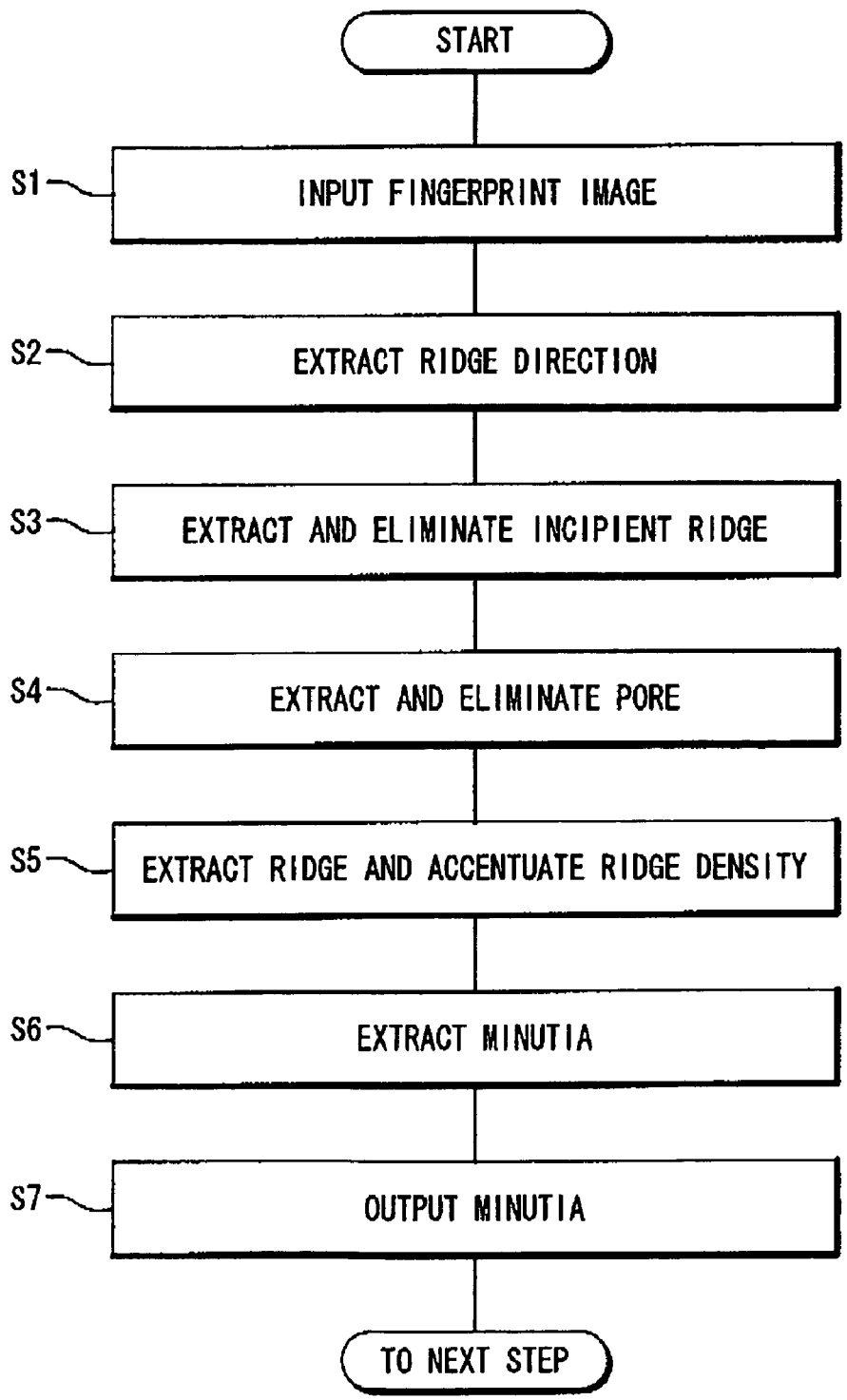
FIG. 5 is an overall flowchart.

At the step S1 in FIG. 5, the fingerprint image inputting unit 11 inputs a fingerprint image. The fingerprint image inputting unit 11 scanned and digitized the fingerprint image or inputs the fingerprint file in which already digitized fingerprint data is included.

Figure 7:
FIG. 7 is a view showing a fingerprint image.

FIG. 7 is an example of the fingerprint image scanned by a sensor or scanner and digitized. The fingerprint image shown in FIG. 7 is digitized so as to have the 256 gray-scales (from 0 to 255) at a resolution of 500 dpi (dot per inch), in accordance with ANSI/NIST-CSL-1-1993 Data Format for the Interchange of Fingerprint, Facial & SMT Information, which was standardized on the basis of US National Institute of Standards and Technology.

In the standard, the density value representation is defined in accordance with a brightness standard where as the brightness becomes greater (namely, brighter), the value becomes greater. However, in the present invention, the density value representation is explained under the standard of density where, as the density becomes higher, the value becomes greater. Thus, the ridge portion which is high in density have the value close to the maximum of 255, and the white portion of the background paper and ridge groove which are thin in density have the density value close to 0. Here, the ridge groove is similar to the valley line, and indicates the relatively white portion between the ridges.

(2) Step S2

Next, at the step S2, the ridge direction extracting unit 12 extracts the direction of the ridge for each predetermined small region. The ridge direction (namely, longitudinal direction of the ridge line) of the fingerprint can be automatically extracted by applying, for example, the conventional technique disclosed in Japanese Laid Open Patent Application (JP-A-Showa, 52-97298) or the conventional technique disclosed in Japanese Laid Open Patent Application (JP-P 2002-288641A).

Figure 9:
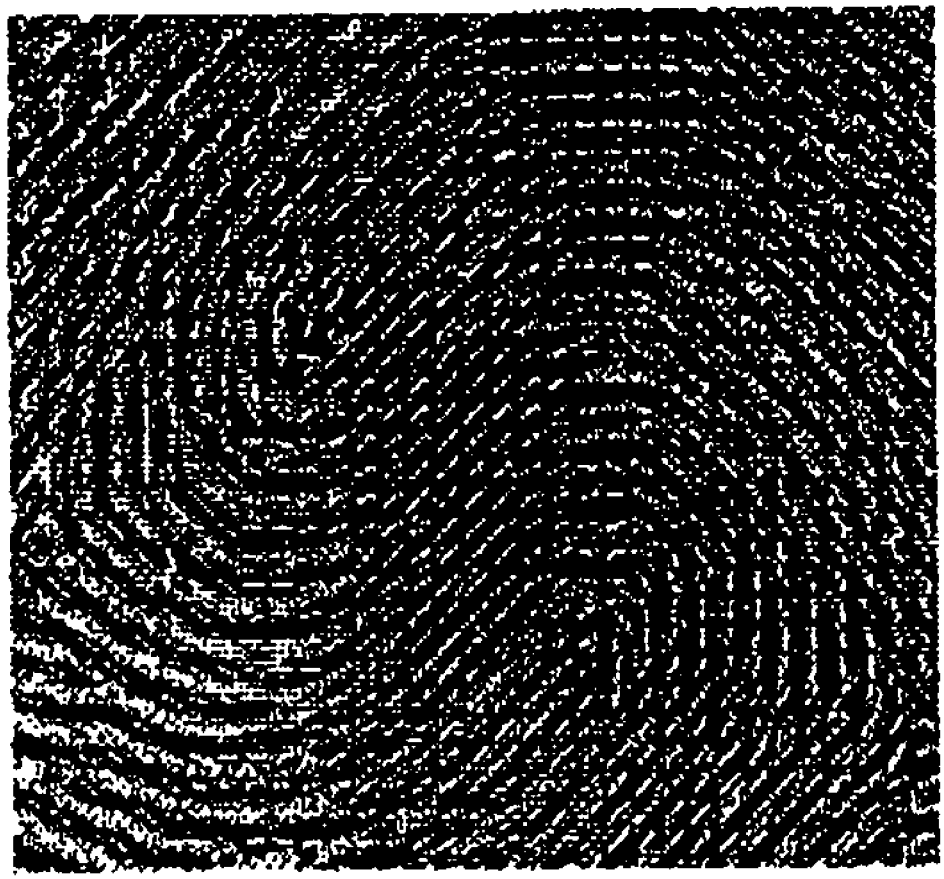
FIG. 9 is a view showing a ridge direction.
Figure 10:
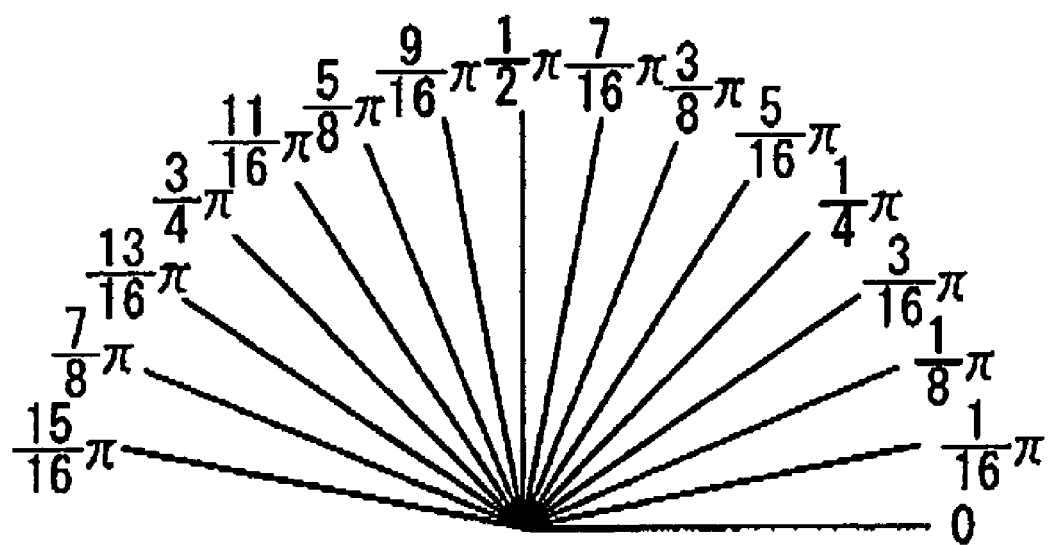
FIG. 10 is a view showing a direction pattern (16 directions)

FIG. 9 shows the result after the direction of the fingerprint image in FIG. 7 is extracted by the conventional technique disclosed in Japanese Laid Open Patent Application (JP-P 2002-288641A) . In FIG. 9, short lines are overlapped and displayed on the fingerprint image. The short lines indicate the directions of the pieces of ridge lines each of which is placed at a small region of 8×8 pixels. The ridge line directions are quantified into 16 discrete values as shown in FIG. 10.

The following incipient ridge line extracting and eliminating process, sweat pore extracting and eliminating process and ridge extracting and accentuating process are performed on only the region where the ridge direction is successfully extracted.

(3) Step S3

Next, at the step S3, the incipient ridge extracting and eliminating unit 13 extracts and eliminates the incipient ridge line. This process is one of the main processes of this embodiment, and its detailed explanation will be described later.

(4) Step S4

Next, at the step S4, the pore extracting and eliminating unit 14 extracts and eliminates the sweat pores. This process is one of the main processes of this embodiment, and its detailed explanation will be described later.

(5) Step S5

Next, at the step S5, the ridge extracting and accentuating unit 15 in FIG. 1 extracts the ridge and the valley and enhances the densities of the ridge and the valley. This process is one of the main processes of this embodiment, and its detailed explanation will be described later.

The processes of the steps S3 to S5 can be executed in any order. Also, only any one process or any combination of two processes selected from the three processes S3 to S5 may be executed.

(6) Step S6

Next, at the step S6, the minutia extracting unit 16 in FIG. 1 extracts the minutia of the fingerprint, such as an end point and a bifurcation, from the gray-scale image data. This minutia extracting process can be realized by applying the conventional techniques, for example, [Pattern Feature Extracting Apparatus] of Japanese Laid Open Patent Application (JP-A-Showa, 55-138174) and its U.S. Pat. No. 4,310,827 "Device for extracting a density as one of pattern features for each minutia of a streaked pattern".

(7) Step S7

Next, at the step S7, the minutia outputting unit 17 in FIG. 1 outputs the minutia data extracted by the minutia extracting unit 16 to the subsequent processing units. In the subsequent process, usually, in a case that an input image is on a filing side (for the purpose of registration), it is registered in a database, and in a case that the input image is a searching side (for the purpose of inquiry) it is used for a minutia matching.

The operation of the incipient ridge extracting and eliminating unit 13 will be described below in detail with reference to the configuration view in FIG. 2, the flowchart in FIG. 6 and the related views in FIGS. 7 to 17.

Figure 8:
FIG. 8 is a view showing a false minutia.

FIG. 7 is an example of the fingerprint image where the incipient ridge lines are thick, and this image is used for explaining the incipient ridge line extracting and eliminating process. If the incipient ridge lines are thick, the incipient ridge lines are erroneously judged as the true ridges. This misjudgment causes the emergence of a large number of false minutiae. FIG. 8 shows an example of such false minutiae.

At a time when the incipient ridge line extracting and eliminating process is started, the already-inputted fingerprint image and the already-extracted ridge direction data of inputted fingerprint image are stored in the data storing unit 22 in FIG. 2.

(1) Step S31

Figure 6:
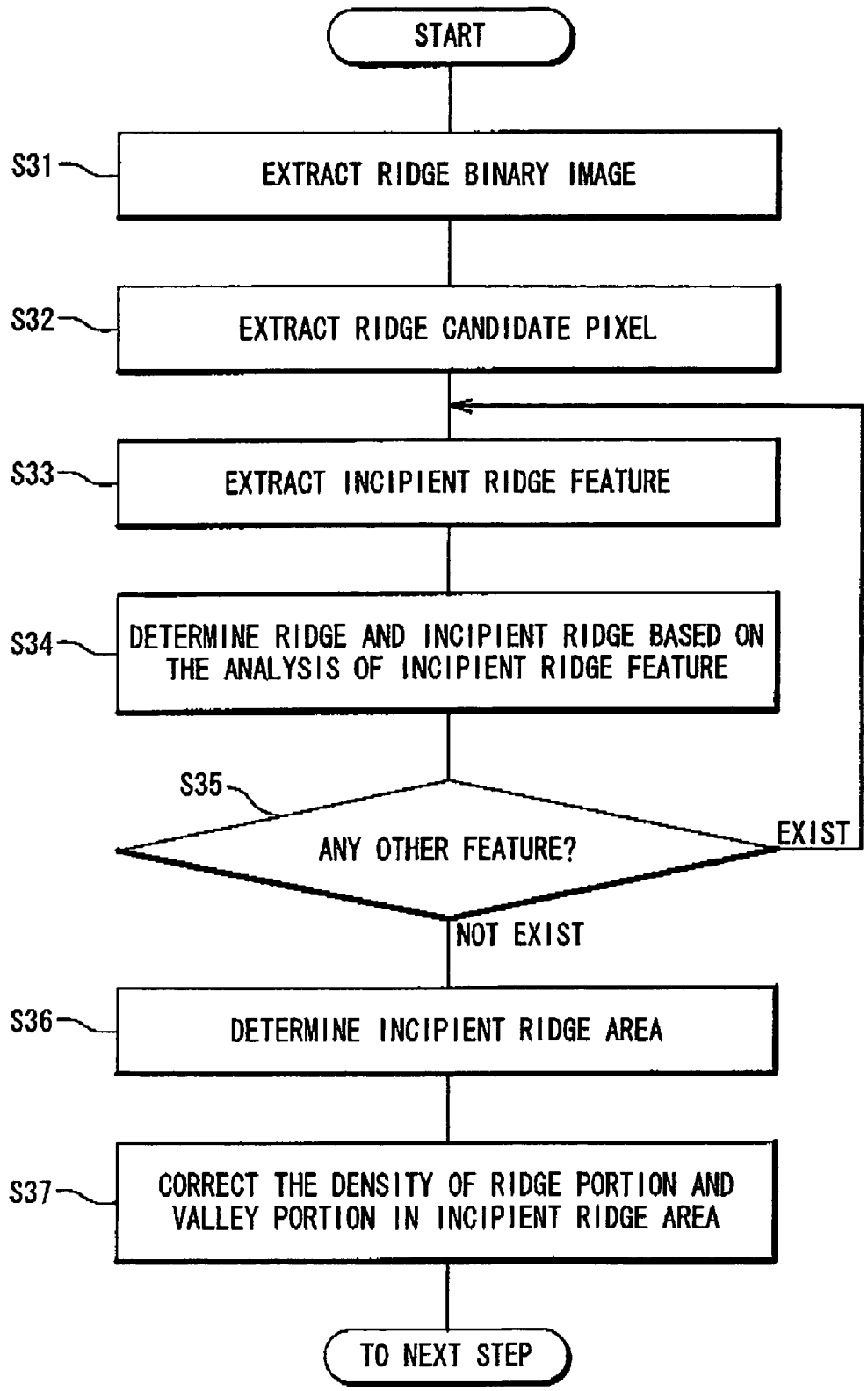
FIG. 6 is a flowchart of an incipient ridge line extracting and removing process.

At the step S31 in FIG. 6, the ridge binary image extracting unit 23 shown in FIG. 2 extracts the binary image in which the ridge portion is represented by "1" and the ridge groove by "0". In the binary image, the "1" of the ridge portion is also referred to as a black pixel, and the "0" of the ridge groove is also referred to as a white pixel.

In order to reduce the influence of the noise in extracting the fingerprint image ridge, typically, a smoothing process is performed on the ridge direction, and an edge enhancement process is performed on a direction orthogonal to the ridge. Such a process can be carried out by using the conventional technique disclosed in [Stripe Pattern Extracting Apparatus] of Japanese Laid Open Patent Application (JP-A-Showa, 51-77138). In this embodiment, a ridge enhancing mask shown in FIG. 11 is used to enhance the ridge and reduce the noise. In this masking process, a mask is selected corresponding to the ridge direction of a remarked pixel, the remarked pixel is set to the center of the mask, the densities of vicinity pixels are multiplied by the weighting factors of the mask, and the summation of the multiplied values is used as the density of remarked pixel.

Next, a ridge density threshold is calculated for the binary image conversion. Various threshold calculating methods for converting the fingerprint gray-scale image into the binary value have been proposed. Here, one example that enables the easy calculation is indicated.

A density distribution of pixels within a 10-pixel radius with a certain remarked pixel as a center is investigated. This length of the radius (in this example, 10 pixels) is defined as the distance approximately equal to an average width between the neighboring ridges so that both fingerprint ridge and valley are contained within an inspection range. Here, the line generated in the groove between the two ridges adjacent to each other is referred to as the valley line.

In a conventional technique, the middle value between the maximum value and the minimum value in the nearby density distribution is used as the threshold. For reducing the noise possibly included in the pixels other than the ridge portion and the valley portion, it is desirable to exclude the pixel having the densest density value and the pixel having the lightest density value from the following calculation.

In the region where the fingerprint is printed, an area occupied by the fingerprint ridge portion is different between the case when the fingerprint ridge is densely pressed and the case when the fingerprint ridge is lightly pressed. Experientially in the majority of cases, the area is included between approximately 20% and 80%.

So, a histogram is calculated from the region of the 10-pixel radius, the density value having a histogram cumulative value of 20% from the lightest density is assumed to be minD, and the density value having the histogram cumulative value of 20% from the densest density is assumed to be maxD, a threshold Th is defined as follows.

$$Th=(minD+maxD)/2$$

Figure 12:
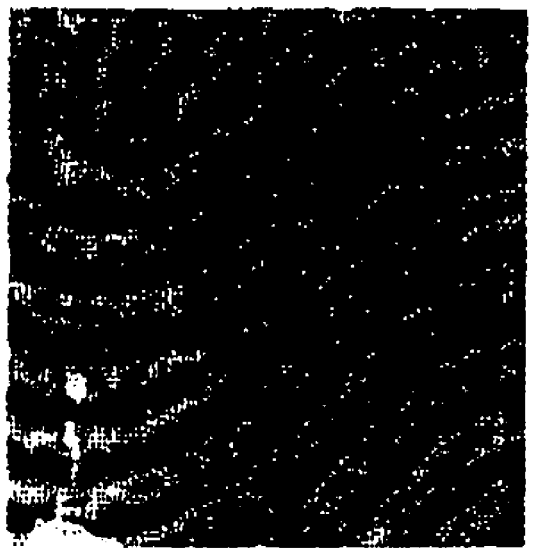
FIG. 12 is a view showing a gray-scale image including an incipient ridge line and a binary image.
Figure 12:

Next, if the density of this remarked pixel is higher than the threshold Th, it is determined as the black pixel, and if the density is lower, it is determined as the white pixel. The binary image can be generated by performing this process on all pixels in the region where the ridge direction is determined. The right side of FIG. 12 shows the ridge binary image extracted in this way, for the fingerprint image on the left side picture of FIG. 12. As understood from the right side of FIG. 12, the black pixel in this ridge binary image includes not only the candidate for the true ridge but also the candidate for the incipient ridge line.

The extracted ridge binary image is stored in the data storing unit 22 through the data processing and controlling unit 21.

(2) Step S32

Next, at the step S32 of FIG. 6, the ridge candidate pixel extracting unit 24 shown in FIG. 2 converts the ridge binary image into a skeleton and consequently extracts the pixel group which is supposed to be a candidate of the ridge. The reason why the skeleton image is used as the ridge candidate pixel group is that in a process for distinguishing the ridge and the incipient ridge, the treatment of the skeleton composed of lines having small widths is easier than that of the ridge having larger width.

Figure 13:
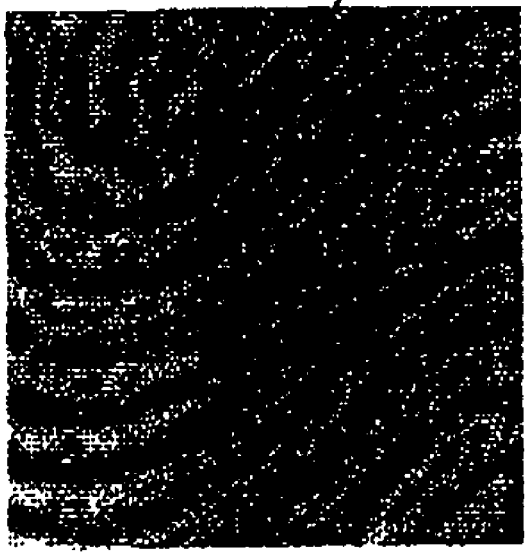
FIG. 13 is a view showing the gray-scale image including the incipient ridge line and a skeleton image.

The process for converting the binary image into the skeleton has been proposed variously. In this embodiment, the simple strategy for using the ridge direction is employed. In short, at each black pixel, the trace is carried out in the direction orthogonal to the ridge line, and it is judged whether or not the pixel is the central pixel in the black pixels. If there is the possibility of the central pixel, it is left in its original state, and if it is not the central pixel, it is changed to the white pixel. Although the thus-extracted skeleton pixel is not the skeleton in a strict sense to insure a linkage at a line width 1, it is sufficient as the ridge candidate pixel. The right side of FIG. 13 shows the image where the thus-extracted ridge candidate pixel group overlapped on the fingerprint image is displayed. The extracted ridge candidate pixel group is stored in the data storing unit 22 through the data processing and controlling unit 21.

(3) Step S33

Next, at the step S33 of FIG. 6, the incipient ridge feature extracting unit 25 shown in FIG. 2 extracts the incipient ridge feature for each pixel in the ridge candidate pixel group. The incipient ridge feature implies the characteristic feature to distinguish the incipient ridge and the ridge, and the various kinds of incipient ridge features may be employed. In this embodiment, the ridge width is employed as one of the incipient ridge features. The ridge width is known to be relatively wide in the true ridge portion and relatively narrow in the incipient ridge line portion. In extracting the ridge width, the ridge binary image extracted at the step S31 is used. The ridge width can be easily extracted by tracing the black pixel in both directions (two orientations) crossing to the ridge direction from the ridge candidate pixel. Here, the direction crossing to the longitudinal direction (or longitudinal direction) of the ridge line is used for processing. Preferably, the direction orthogonal to the longitudinal direction of the ridge line is used. The direction is referred to as the direction orthogonal to the ridge line, and both of the directions orthogonal to the ridge are also referred to as the right and left directions orthogonal to the ridge line.

The extracted incipient ridge feature is stored in the data storing unit 22 through the data processing and controlling unit 21.

(4) Step S34

Next, at the step S34 of FIG. 6, the incipient ridge feature analyzing unit 26 shown in FIG. 2 analyzes the incipient ridge feature extracted for the ridge candidate pixel group. The analysis of the incipient ridge feature in this embodiment is carried out by tracing from the remarked pixel to the right side in the direction orthogonal to the ridge and comparing with the incipient ridge feature of the nearby ridge candidate pixel. This step is one of the main steps in this embodiment and explained in detail with reference to FIGS. 13 to 15.

The left side picture of FIG. 13 is the enlarged view of the ridge image including the thick incipient ridge lines. On the right side picture of FIG. 13, the image same to the left side picture of FIG. 13 and the ridge candidate pixel group are overlapped.

Figure 14:
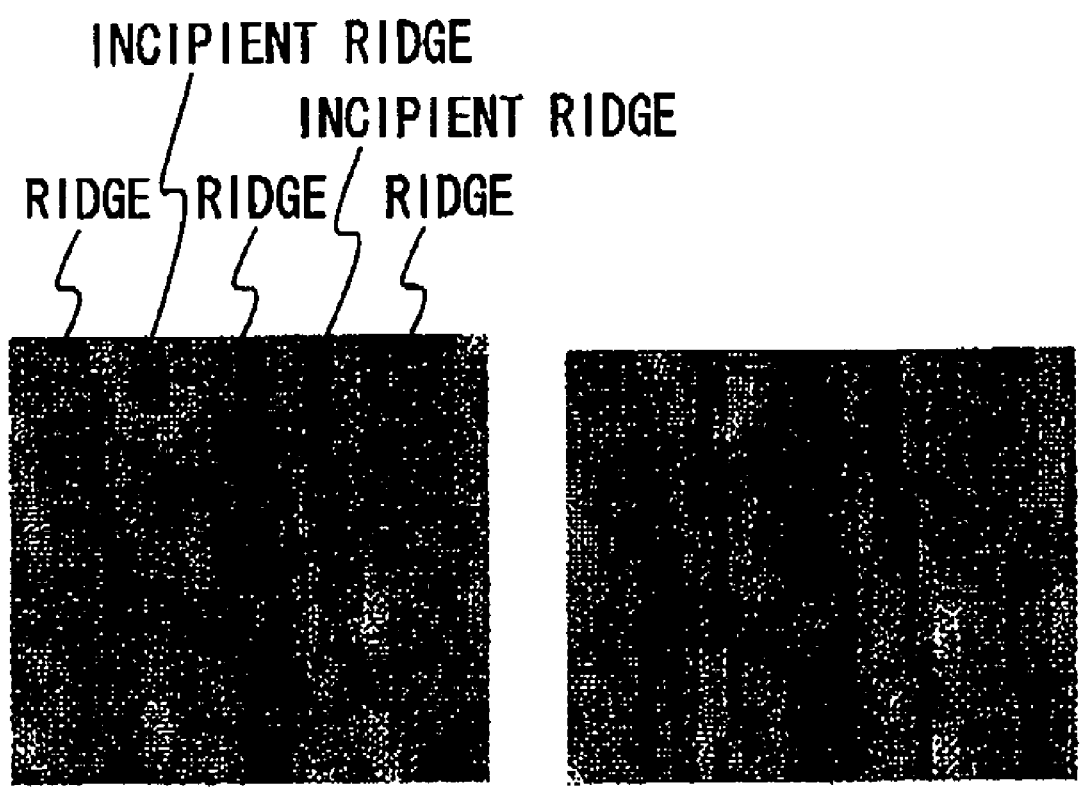
FIG. 14 is a view showing a focused area after a rotation.

The left side picture of FIG. 13 will be explained below by using the remarked pixel area indicated as the rectangular frame in FIG. 13. FIG. 14 shows the image where this remarked pixel area in the rectangular frame is rotated such that the ridge direction is vertical and the direction orthogonal to the ridge is horizontal. On the right side of FIG. 14, the ridge candidate pixel group is overlapped on the gray-scale image.

On the left side picture of FIG. 14, three ridge lines and two incipient ridge lines are recognized. Typically, the incipient ridge line does not appear singularly. Usually the plurality of incipient ridge lines arranged in parallel appear in an area of a fingerprint. Thus, when the incipient ridge lines appear, the true ridges and the incipient ridge lines appear alternately in the direction orthogonal to the ridge. Also in this case, the incipient ridge features are alternately changed. Hence, if its pattern can be extracted, the incipient ridge line can be recognized.

In the case shown in the left side picture of FIG. 14, there are five ridge lines arranged at substantially same intervals in the direction orthogonal to the longitudinal directions of the ridge lines. In some cases, all of the five ridge lines are the true ridge lines. In another case, 3 lines are the true ridge lines and the other two lines are the incipient ridge lines. In further another case, the two lines are the true ridge lines and the other three lines are the incipient ridge lines. In this embodiment, the incipient ridge features of the five ridge lines are compared so that the true ridge lines and the incipient ridge lines are distinguished. For example, when the five ridges are arranged, if there is the significant difference between the three incipient ridge features of the first, third and fifth lines and the two incipient ridge features of the second and fourth lines, the incipient ridge lines are considered to be included. Here, the three incipient ridge features of the first, third and fifth lines are referred to as an odd-numbered incipient ridge feature, and the two incipient ridge features of the second and fourth lines are referred to as an even-numbered incipient ridge feature.

Figure 15:
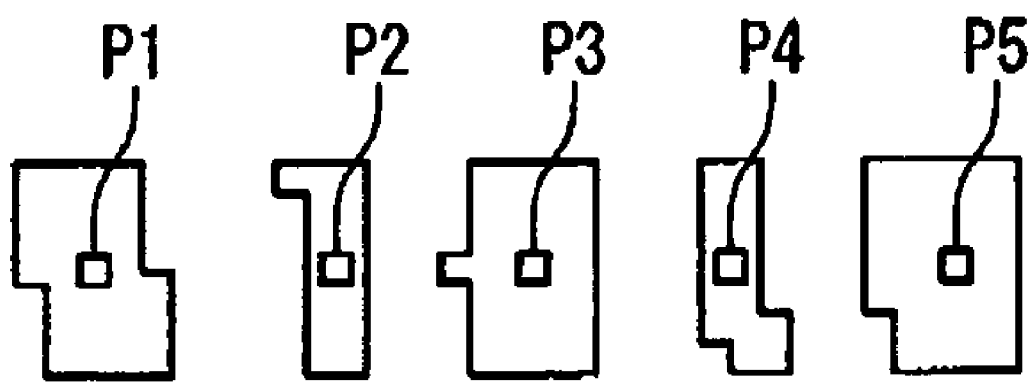
FIG. 15 is a view showing an example of an incipient ridge feature (ridge width)

FIG. 15 is a binary image of a part of the region in FIG. 14. In FIG. 15, when P1 is assumed to be a remarked ridge candidate pixel, the ridge candidate pixels from P2 to P5 are defined on the right side of FIG. 15. At this time, the three incipient ridge features of P1, P3 and P5 are the odd-numbered incipient ridge features, and the two incipient ridge features of P2 and P4 are the even-numbered incipient ridge features.

When the ridge width is employed as the incipient ridge feature, the judgment of the true ridge and the incipient ridge, namely, the classification of the ridge lines into true ridge lines and incipient ridge lines can be carried out by applying the following condition. Here, the maximum value of the incipient ridge feature is defined as maxFA. The maximum value and minimum value of the odd-numbered incipient ridge features are defined as maxFO and minFO respectively. The maximum value and minimum value of the even-numbered incipient ridge features are defined as maxFE and minFE respectively. Also, 4 pitches (intervals between the adjacent ridge lines) are measured between the five ridge lines, and the maximum value and minimum value of the four pitches are defined as maxP and minP respectively.

Condition 1A: The case that the odd-numbered incipient ridge feature corresponds with the true ridge line and the even-numbered incipient ridge feature corresponds with the incipient ridge line, 1) minFO>maxFE
2) (minFO−maxFE)/maxFA>thD1
3) minP/maxP>thP Here, thD1 and thP are preset threshold parameters. From an actual fingerprint data, for example, thD1 is set to about 0.30 and thP is set to about 0.65 for the proper judgment.

The incipient ridge judgment process using this condition 1A is explained bellow with reference to FIG. 15. In FIG. 15, when the ridge width is employed as the incipient ridge feature, the values (namely, number of pixels) of the incipient ridge features from P1 to P5 are 5, 2, 5, 2 and 6, and as a result, maxFA=6, minFO=5 and maxFE=2.

Also, the four pitches between the five ridges are 4, 5, 4 and 6 (their units are pixels), and as a result, minP=4 and maxP=6. Thus, 1) 5>2
2) (5−2)/6>0.3
3) 4/6>0.65

As mentioned above, all of the conditions are satisfied. As a result, the odd-numbered ridge lines are judged to be the true ridge lines, and the even-numbered ridge lines are judged to be the incipient ridge lines.

In short, if the ridge width of the odd-numbered ridge is significantly larger than the ridge width of the even-numbered ridge and their pitches are substantially equal, the even-numbered ridge can be judged to be the incipient ridge line. As a result, the mark of the true ridge is assigned to P1, P3 and P5, and the mark of the incipient ridge line is assigned to P2 and P4.

In the case that the remarked pixel is in the incipient ridge line, the incipient ridge line can be judged by applying the following condition 1B.

Condition 1B; The case that the odd-numbered ridge is the incipient ridge line and the even-numbered ridge is the true ridge,
1) maxFO<minFE
2) (minFE−maxFO)/maxFA>thD1
3) minP/maxP>thP This condition is the pattern opposite to the case of the condition 1A so that its meaning is apparent from the above explanation of the condition 1A.

This analysis is performed on all of the ridge candidate pixels. As the result of the analysis, the true-ridge mark or incipient ridge mark or unclear mark is assigned to each of the all ridge candidate pixels.

This analysis result is stored in the data storing unit 22 through the data processing and controlling unit 21.

(5) Step S35

Next, at the step S35 of FIG. 6, the data processing and controlling unit 21 of FIG. 2 monitors the progress of the extraction and analysis. When the extraction and analysis are finished for all the preset incipient ridge features, the process from the step S36 is executed. When the extraction and analysis are not finished, namely, there are some incipient ridge features which are not analyzed yet, the process from the step S33 is executed again for the not-analyzed incipient ridge feature.

The other example of the incipient ridge feature defined by using the ridge direction density is explained below. In this case, the operational flow from the step S33 of FIG. 6 is executed for extracting the ridge direction density. The ridge direction density is calculated as follows. The densities of the pixels located about ±5 pixels from the remarked pixel are traced to the ridge direction and their densities are averaged. Typically, the ridge direction density of the incipient ridge line portion is lower than the ridge direction density of the true ridge portion.

Next, at the step S33 of FIG. 6, the incipient ridge feature analyzing unit 26 shown in FIG. 2 analyzes the incipient ridge feature extracted from the ridge candidate pixel group.

The process when the ridge direction density is employed as the incipient ridge feature is similar to the case that the ridge width is employed as explained above. The conditional equations are similar. However the threshold values used to define the condition are preset to the value suitable for the data property of the ridge direction density.

Condition 2A: The case that the odd-numbered ridge lines are the true ridge lines and the even-numbered ridge lines are the incipient ridge lines, the set of following equations represents the condition.
1) minFO>maxFE
2) (minFO−maxFE)/maxFA>thD2
3) minP/maxP>thP Desirably all of the three equations should be satisfied.

Condition 2B: The case that the odd-numbered ridge lines are the incipient ridge lines and the even-numbered ridge lines are the true ridge lines,
1) maxFO<minFE
2) (minFE−maxFO)/maxFA>thD2
3) minP/maxP>thP Here, thD2 and thP are the preset threshold parameters. From an actual fingerprint data, for example, thD2 is set to about 4.0 and thP is set to about 0.62 for the proper judgment.

(6) Step S36

When the processes for all of the incipient ridge features have been completed, at the step S36 of FIG. 6, the incipient ridge area extracting unit 27 shown in FIG. 2 analyzes the ridge candidate pixel group to which the true-ridge mark or incipient-ridge-line mark is assigned and extracts the incipient ridge area.

The incipient ridge area extracting unit 27 traces about ±8 pixels from the remarked pixel in the ridge candidate pixel group in the ridge direction among the remarked ridge candidate pixels and counts the number of marks assigned to the respective pixels and then calculates the ratio of the number of the true-ridge mark and the ratio of the number of the incipient-ridge-line mark against the number of all traced pixels (17 pixels).

For a remarked pixel, if the traced assigned marks are only the true-ridge marks and when its ratio is equal to or higher than a certain threshold, the remarked pixel is determined as the true ridge pixel. The threshold in this case is appropriately set to, for example, about 50%. If the traced assigned marks are only the incipient ridge marks and when its ratio is equal to or higher than a certain threshold, the remarked pixel is determined as the incipient ridge pixel. The threshold in this case is appropriately set to about 30%. This process is performed on all of the ridge candidate pixels.

Next, from each of the determined incipient ridge pixels (called 1st pixel), maximum of 10 pixels are traced on the right side in the direction orthogonal to the ridge. When the ridge candidate pixel (called 2nd pixel) is found on the tracing and the 2nd pixel is determined to be in true ridge line, it is recognized that the 1st pixel is in the incipient ridge line and the 2nd pixel is in the true ridge line. Further, it is recognized that there is no other true ridge and incipient ridge between the 1st pixel and the 2nd pixel. The midpoint of the 1st pixel and the 2nd pixel is calculated. Each of the pixels located between the 1st pixel and the midpoint are determined as true valley pixel (in other word, "white pixel"). Each of the pixels located between the midpoint and the 2nd pixel are determined as true ridge pixel ("black pixel"). This determination process is also executed on the left side in the direction orthogonal to the ridge.

This process is performed on all incipient ridge pixels. The pixel group determined as the valley line pixels or true ridge pixels through this process is determined as the incipient ridge area.

Figure 16:
FIG. 16 is a view showing an incipient ridge area.

FIG. 16 shows an example of the thus-determined incipient ridge area. FIG. 16 is the result of the extraction of the incipient ridge area for the fingerprint region shown in FIG. 7. In FIG. 16, black areas indicate the pixel groups determined as the true ridge, and gray areas indicate the pixel groups determined as the incipient ridge.

The thus-extracted incipient ridge areas are stored in the data storing unit 22 through the data processing and controlling unit 21.

Next, at the step S36 of FIG. 6, the incipient ridge area density correcting unit 28 shown in FIG. 2 corrects the density value for the pixel group defined as the incipient ridge area and consequently extracts the image from which the incipient ridge line is removed.

At first, for the remarked pixel, an assumed ridge density and an assumed valley density in its nearby area are determined. The nearby area is desirably defined so that it includes both of the ridge and the valley. For example, the area of about 16×16 pixels is defined as the nearby area in this case. The assumed ridge density may be defined as the maximum density value. The assumed ridge density may be defines as the density value that is lower by about 10% with respect to a histogram accumulation value from the density maximum value for suppressing the influence of the noise. The assumed valley density may be defined as the minimum density value. The assumed valley density may be defined as the density value that is higher by about 10% with respect to the histogram accumulation value from the minimum value for suppressing the influence of the noise.

(7) Step S37

Figure 17:
FIG. 17 is a view showing an incipient ridge area density corrected image.

Next, the mark attached to the remarked pixel is checked. If the remarked pixel is the valley pixel (white pixel), the density of the pixel is replaced with an assumed valley density value. By this replacement, the valley is clearly enhanced. If the remarked pixel is the true ridge pixel (black pixel), the density of the pixel is replaced with an assumed ridge density value. By this replacement, the true ridge is clearly enhanced. Namely, a corrected image is generated by approximating densities of pixels classified as said incipient ridges in Step S34 close to the density of valley lines in the fingerprint image. This process is performed on all of the pixels within the incipient ridge area. FIG. 17 shows the thus-corrected ridge image. From FIG. 17, it is known that the density value within the incipient ridge area shown in FIG. 16 is corrected and that the pixel group judged as the incipient ridge line is removed.

The image which is corrected as mentioned above and from which the incipient ridge line is removed is stored in the data storing unit 22 through the data processing and controlling unit 21 and then sent to the minutia extracting unit 16. Here, we come to the end of the detailed explanation of the embodiment of the incipient ridge extracting and eliminating unit 13.

The operations of the pore extracting and eliminating unit 14 of FIG. 1 will be described below in detail with reference to the configuration view of FIG. 3, a flowchart of FIG. 18 and related views of FIGS. 19 to 27.

Figure 19:
FIG. 19 is a view showing a fingerprint image.
Figure 20:
FIG. 20 is a view showing an example of a false minutia.

FIG. 19 is an example of the fingerprint image having the thick sweat pores, and this image is used in the following explanation of the sweat pore extracting and eliminating process. If the sweat pores exist continuously or become enlarged, the line including the sweat pore is erroneously recognized as a valley line. As a result, two ridge lines are erroneously extracted from only one true ridge line. This results in the occurrence of many false minutiae. FIG. 20 shows an example of such false minutiae.

Figure 21:
FIG. 21 is a view showing a gray-scale image including a continuous sweat pore and its skeleton image.
Figure 21:
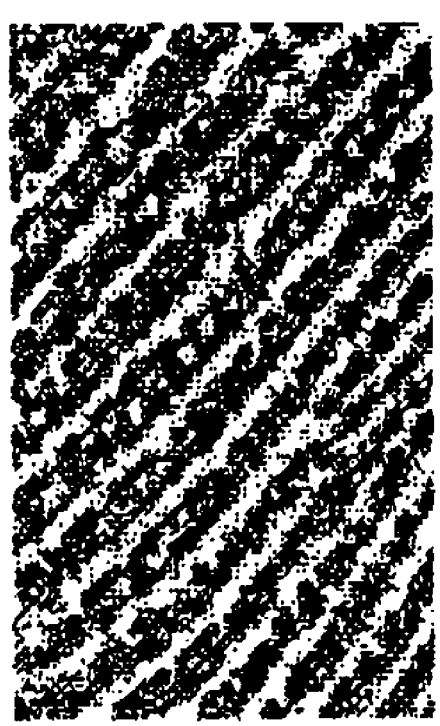

The left side picture of FIG. 21 is the enlarged view of the ridge image including the thick sweat pores. Then, on the right view of FIG. 21, the skeleton image extracted from the ridge image on the left side picture of FIG. 21 is overlapped.

Figure 22:
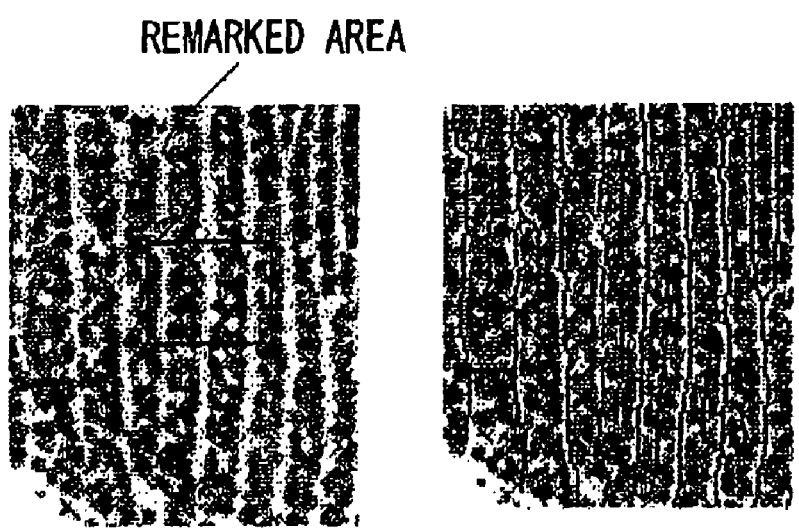
FIG. 22 is a view showing a ridge including a sweat pore and a valley candidate pixel.

Also, on the left side picture of FIG. 22, after the region where the sweat pores are thick on the left side picture of FIG. 21 is cut away, the region is rotated such that the ridge direction becomes vertical and the direction orthogonal to the ridge becomes horizontal.

At the time when the sweat pore extracting and eliminating process is started, the already-inputted fingerprint image and the already-extracted ridge direction data are stored in the data storing unit 32 of FIG. 3.

(1) Step S41

Figure 18:
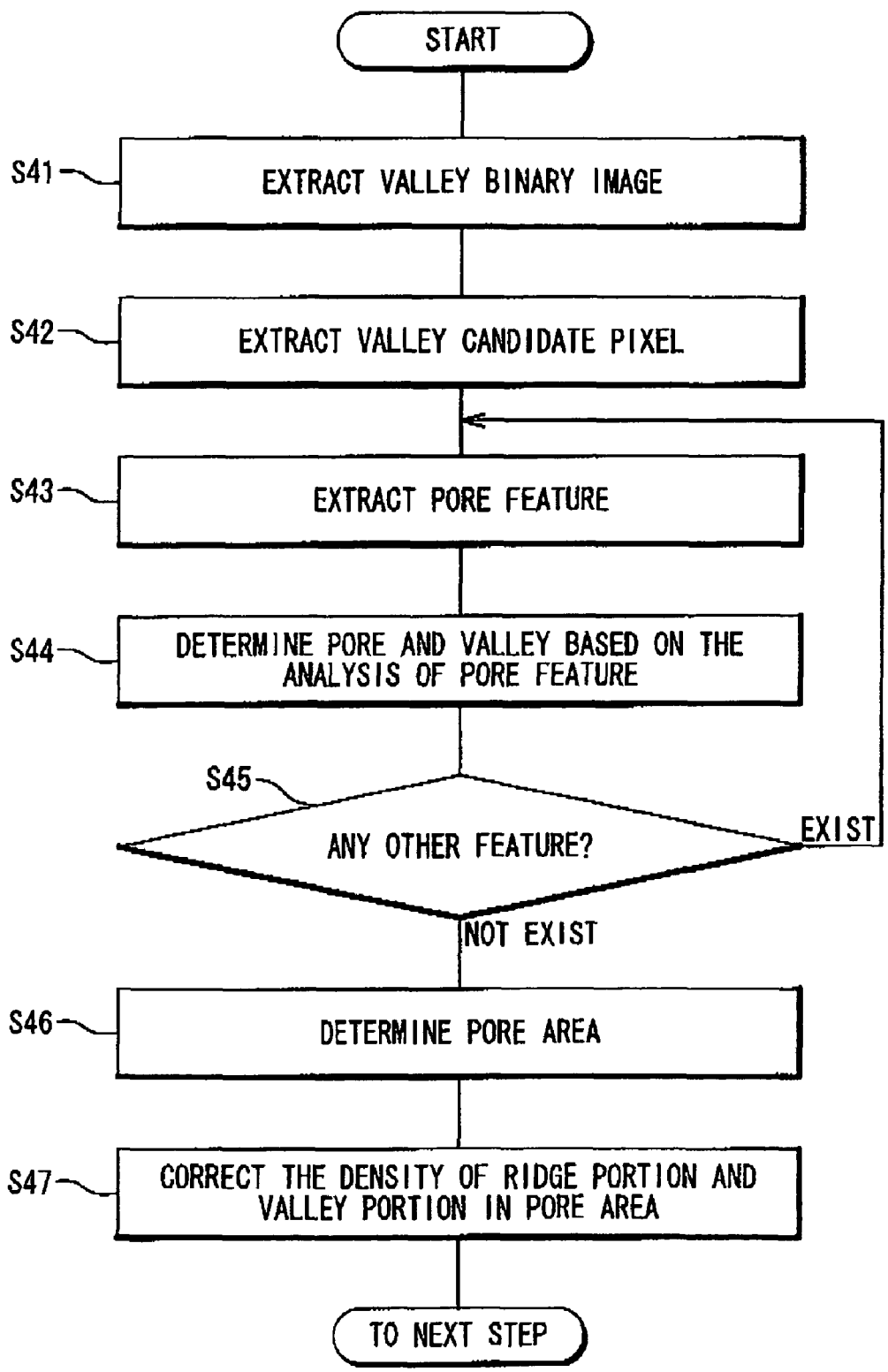
FIG. 18 is a flowchart of a sweat pore extracting and removing process.

At the step S41 of FIG. 18, the valley binary image extracting unit 33 shown in FIG. 3 extracts the binary image in which the valley portion is represented by "1" and the ridge portion by "0". In the valley line binary image, the "1" of the valley portion is referred to as the black pixel, and the "0" of the ridge portion is referred to as the white pixel.

Figure 23:
FIG. 23 is a view showing a reversed density image of the ridge including the sweat pore.

The extraction of the valley line binary image may be carried out by extracting the ridge binary image after performing the density inversion on the usual image in which the ridge line is printed in black. The density inversion is carried out by defining a complement of 255 corresponding to the density value of each pixel as the density value of the inversion image. FIG. 23 shows the image where the density inversion is performed on the image on the left side picture of FIG. 22.

The ridge binary image extracting process for the image after the density inversion can be performed in the same manner as the ridge binary image extracting unit 23 in the incipient ridge extracting and eliminating unit 13 explained before.

The thus-extracted valley line binary image is stored in the data storing unit 32 through the data controlling unit 31.

(2) Step S42

Next, at the step S42 of FIG. 18, the ridge candidate pixel extracting unit 34 shown in FIG. 3 converts the valley line binary image into a skeleton and consequently extracts the pixel group supposed to be a candidate of the valley line. The reason why the skeleton image is used as the valley candidate pixel group is that in a process for distinguishing the valley line and the line having the sweat pore, the treatment of the skeleton having a smaller width is easier than that of the valley line having larger width.

The process for converting the binary image into the skeleton can be carried out by using the already explained method performed by the ridge candidate pixel extracting unit 24 in the incipient ridge extracting and eliminating unit 13. The right side picture of FIG. 22 shows the image where the thus-extracted valley candidate pixel group (skeleton image) overlapped on the fingerprint image is displayed.

(3) Step S43

Next, at the step S43 of FIG. 18, the pore feature extracting unit 35 shown in FIG. 3 extracts the sweat pore feature, for each pixel in the valley candidate pixel group. The sweat pore feature implies the characteristic feature to distinguish the sweat pore and the valley line, and the various kinds of sweat pore features may be employed. In this embodiment, the ridge direction density is employed as one of the sweat pore features. The ridge direction density is obtained by tracing about ±5 pixels from the remarked pixel to the ridge direction and then averaging their densities. Typically, the ridge direction density of the sweat pore portion is higher than the ridge direction density of the true valley line portion.

(4) Step S44

Next, at the step S44 of FIG. 18, the pore feature analyzing unit 36 shown in FIG. 3 analyzes the sweat pore feature extracted from the valley candidate pixel group. The analysis of the sweat pore feature in this embodiment is carried out by tracing from the remarked pixel to the right side in the direction orthogonal to the ridge and then comparing with the sweat pore feature of the nearby valley candidate pixel. This step is one of the main steps of this embodiment. Thus, this is explained in detail with reference to FIGS. 24 to 25.

Figure 24:
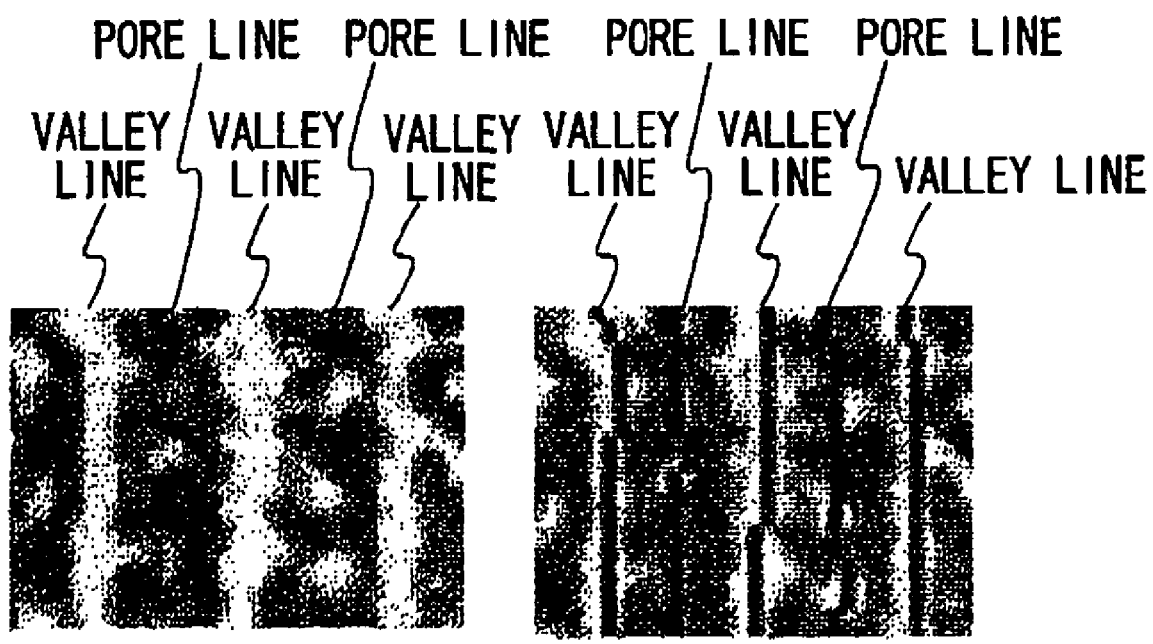
FIG. 24 is a view showing the ridge including the sweat pore and a valley candidate pixel.

The left side picture of FIG. 24 is the view where the remarked area shown on the left side picture of FIG. 22 is enlarged and includes ridge lines and sweat pores. On the right side picture of FIG. 24, the image same to the left side picture of FIG. 24 and the valley candidate pixel group are overlapped.

In the left side picture of FIG. 24, three valley lines and two sweat pores are recognized. Typically, the sweat pore which cause the false minutia does not appear singularly. Usually a plurality of sweat pores appear in an area of a fingerprint. Thus, when the sweat pores appear, the true valley lines and the sweat pores appear alternately in the direction orthogonal to the ridge. In this case, the sweat pore features are alternately changed. Hence, if its pattern can be extracted, the sweat pore can be recognized.

In the case shown in the left side picture of FIG. 24, there are five valley lines arranged at substantially same interval in the direction orthogonal to the longitudinal directions of the valley line. In some cases, all five valley lines are the true valleys. In another case, 3 valleys are the true valleys and the other two valleys are the sweat pores. In further another case, the two valleys are the true valleys and the three valleys are the sweat pores. In this embodiment, the sweat pore features of the valleys are compared so that the true valley lines and the sweat pores are distinguished. For example, when the five valleys are arranged, if there is the significant difference between the three sweat pore features of the first, third and fifth lines and the two sweat pore features of the second and fourth lines, the sweat pores are considered to be included. Here, the three sweat pore features of the first, third and fifth lines are referred to as an odd-numbered sweat pore feature, and the two sweat pore features of the second and fourth lines are referred to as an even-numbered sweat pore feature.

Figure 25:
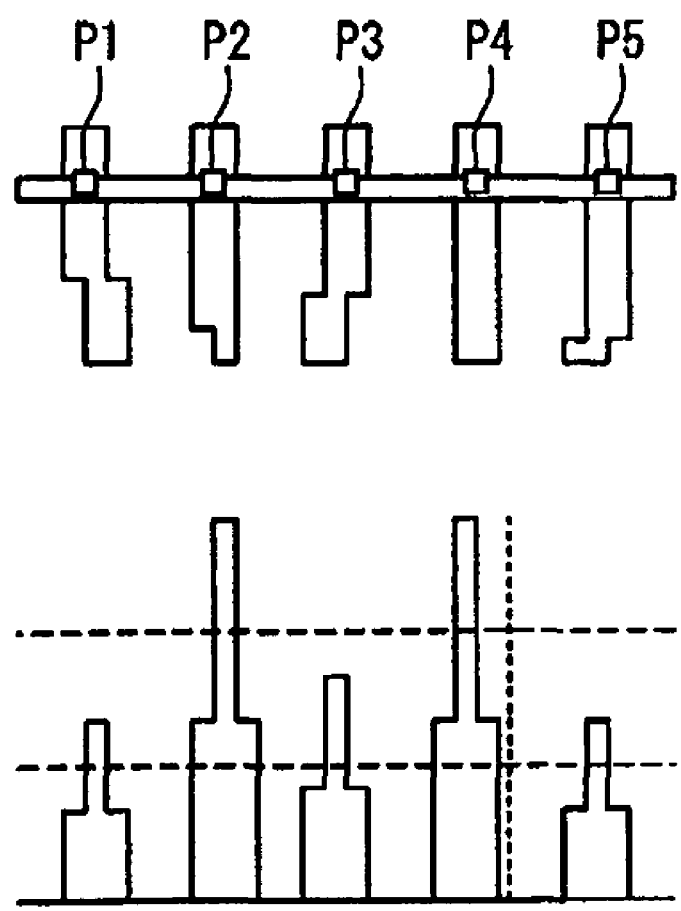
FIG. 25 is a view showing an example of a sweat pore feature.

The upper picture of FIG. 25 is the view where a part of the region on the right side picture of FIG. 24 including valley lines is enlarged. In the upper view of FIG. 25, when P1 is assumed to be a remarked pixel in the valley candidate pixel group, the valley candidate pixels from P2 to P5 are defined on the right side of the remarked pixel. At this time, the three sweat pore features of P1, P3 and P5 are the odd-numbered sweat pore features, and the two sweat pore features of P2 and P4 are the even-numbered sweat pore features.

When the ridge direction density is employed as the sweat pore feature, the judgment of the true valley line and the sweat pore, namely, the classification of the valley line into true valley lines and sweat pores can be carried out by applying the following condition. Here, the maximum value of the sweat pore feature is defined as maxFA. The maximum value and minimum value of the odd-numbered sweat pore features are defined as maxFO and minFO respectively. The maximum value and minimum value of the even-numbered sweat pore features are defined as maxFE and minFE respectively. Also, 4 pitches (intervals between the adjacent valley lines) are measured between the five valley lines, and the maximum value and minimum value of the four pitches are defined as maxP and minP respectively.

Condition 3A: The case that the odd-numbered valley line is the true valley line and the even-numbered valley line is the sweat pore line,
1) maxFO<minFE
2) (minFE−maxFO)/maxFA>thD3
3) minP/maxP>thP Here, thD3 and thP are preset threshold parameters. From an actual fingerprint data, for example, thD3 is set to about 0.2 and thP is set to about 0.65 for the proper judgment.

The sweat pore Judgment process using this condition 3A is explained bellow with reference to FIG. 25. In the upper image of FIG. 25, the density of each valley line indicates the ridge direction density. Also, the downside image of FIG. 25 indicates the densities of valley lines as a histogram. As recognized from the downside image of FIG. 25, the minimum value of the even-numbered sweat pore feature is higher than the maximum value of the odd-numbered sweat pore feature by 30% or more, and the pitches between the adjacent valley lines are substantially equal. Thus, all of the condition 3A is satisfied. As a result, the odd-numbered valley lines are judged to be the true valley lines, and the even-numbered valley lines are judged to be the sweat pore lines.

Thus, the mark of the true valley line is assigned to P1, P3 and P5, and the mark of the sweat pore line is assigned to P2 and P4.

In the case that the remarked pixel is in the sweat pore line, the sweat pore line can be judged by applying the following condition 3B.

Condition 3B: The case that the odd-numbered valley line is the sweat pore line and the even-numbered valley line is the true valley line,
1) minFO>maxFE
2) (minFO−maxFE)/maxFA>thD3
3) minP/maxP>thP This condition is the pattern opposite to the case of the condition 3A so that its meaning is apparent from the above explanation about the condition 3A.

The above mentioned analysis processing is performed on all of the valley candidate pixels. As the result of the analysis, the true-valley mark or sweat-pore mark or unclear mark is assigned to all of the valley candidate pixels.

This analysis result is stored in the data storing unit 32 through the data controlling unit 31.

(5) Step S45

Next, at the step S45 of FIG. 18, the data controlling unit 31 of FIG. 3 monitors the progress of the extraction and analysis. When the extraction and analysis are finished for all the preset sweat pore features, the process from the step S46 is executed. When the extraction and analysis are not finished, the process from the step S45 is executed again for the not-analyzed sweat pore feature.

The other example of the sweat pore feature defined by using a density difference accumulated value is explained below. In this case, the operational flow from the step S43 of FIG. 18 is executed for extracting the density difference accumulated value. The density difference accumulated value is calculated as follows. The densities of the pixels located in the valley candidate pixel group and about ±8 pixels from the remarked pixel are traced to the ridge direction and the density difference between the every adjacent traced pixels are averaged. Typically, at the sweat pore portion, the sweat pore having the small density value and the ridge having the great density value appear alternately, thereby the density difference accumulated value becomes high. On the other hand, since the true valley line has the approximately uniform density values, the density difference accumulated value becomes small.

Next, at the step S44 of FIG. 18, the pore feature analyzing unit 36 shown in FIG. 3 analyzes the sweat pore feature of the density difference accumulated value extracted from the valley candidate pixel group.

The process when the density difference accumulated value is employed as the sweat pore feature is similar to the case that the ridge direction density is employed as explained above. The conditional equations are similar. However the threshold values used to define the condition are preset to the value suitable for the data property of the density difference accumulated value.

Condition 4A: The case that the odd-numbered valley lines are the true valley lines and the even-numbered valley lines are the sweat pore lines,
1) maxFO<minFE
2) (minFE−maxFO)/maxFA>thD4
3) minP/maxP>thP Condition 4B: The case that the odd-numbered ridge lines are the sweat pore lines and the even-numbered ridge lines are the true valley lines,
1) minFO>maxFE
2) (minFO−maxFE)/maxFA>thD4
3) minP/maxP>thP Here, thD4 and thP are the preset threshold parameters. From an actual finger print data, for example, thD4 is set to about 0.25 and thP is set to about 0.65 for the proper judgment.

(6) Step S46

When the process for all of the sweat pore features has been completed, at the step S46 of FIG. 18, the pore area extracting unit 37 shown in FIG. 3 analyzes the valley candidate pixel group to which the true-valley mark or sweat-pore mark is assigned, and then extracts the sweat pore area.

The pore area extracting unit 37 traces about ±18 pixels in the valley candidate pixel group from the remarked valley candidate pixel to the ridge direction, counts the number of marks assigned to the respective pixels and then calculates the ratio of the number of the true-valley mark and the ratio of the sweat-pore mark against the number of all traced pixels (17 pixels).

For a remarked pixel, if the traced assigned marks are only the true-valley marks and its ratio is equal to or higher than a certain threshold, the remarked pixel is determined as the true valley pixel. The threshold in this case is appropriately set to, for example, about 50%. If the traced assigned marks are only the sweat-pore mark and its ratio is equal to or higher than a certain threshold, the remarked pixel is determined as the sweat pore pixel. The threshold in this case is appropriately set to about 20%.

This process is performed on all of the valley candidate pixels.

Next, for each of the determined sweat pore pixels (called 1st pixel), maximum of 10 pixels are traced on the right side in the direction orthogonal to the ridge. When the valley candidate pixel (called 2nd pixel) is found on the tracing and the 2nd pixel is determined to be in true valley line, it is recognized that the 1st pixel is in the sweat pore line. Further, it is recognized that there is no other true valley line and sweat pore line between the 1st pixel and the 2nd pixel.

The midpoint of the 1st pixel and the 2nd pixel is calculated. Each of the pixels located between the 1st pixel and the midpoint are determined as true ridge line (in other word, "black pixel"). Each of the pixels located between the midpoint and the 2nd pixel are determined as true valley pixel ("white pixel"). This determination process is also executed on the left side in the direction orthogonal to the ridge.

This process is performed on all of the incipient ridge pixels. The pixel group determined as the true ridge pixels or the true valley pixels through this process is determined as the sweat pore area.

Figure 26:
FIG. 26 is a view showing a sweat pore area.

FIG. 26 shows an example of the thus-determined sweat pore area. FIG. 26 is the result of the extraction of the sweat pore area for the fingerprint region shown in FIG. 19. In FIG. 26, black areas indicates the pixel group determined as the true ridge although the sweat pores are included, and gray areas indicates the pixel group determined as the true valley line. The thus-extracted sweat pore area is stored in the data storing unit 32 through the data controlling unit 31.

(7) Step S47

Next, at the step S47 of FIG. 18, the pore area density correcting unit 38 shown in FIG. 3 corrects the density value for the pixel group defined as the sweat pore area and consequently extracts the image from which the sweat pore is removed.

At first, for the remarked pixel, an assumed ridge density and an assumed valley density in its nearby area are determined. This process is substantially same to the explanation about the incipient ridge area density correcting unit 28 in the incipient ridge extracting and eliminating unit 13.

Figure 27:
FIG. 27 is a view showing a sweat pore area density corrected image.

Next, the mark attached to the remarked pixel is checked. If the remarked pixel is the black pixel, the density of the pixel is replaced with an assumed ridge density value. By this replacement, the ridge is clearly enhanced. If the remarked pixel is the white pixel, the density of the pixel is replaced with an assumed valley density value. By this replacement, the true valley is clearly enhanced. Namely, a corrected image data is generated by approximating densities of pixels classified into said pores close to the density of true ridges in the fingerprint image, This process is performed on all of the pixels within the sweat pore area. FIG. 27 shows the thus-corrected sweat pore image. From FIG. 17, it is known that the density value in the sweat pore area in FIG. 26 is corrected and that the pixel group judged as the sweat pore is removed.

The image which is corrected as mentioned above and from which the sweat pore is removed is stored in the data storing unit 32 through the data controlling unit 31 and then sent to the minutia extracting unit 16. Here, we come to the end of the detailed explanation of the embodiment of the pore extracting and eliminating unit 13.

The operations of the ridge extracting and accentuating unit 15 shown in FIG. 1 will be described below in detail with reference to the configuration view and the flowchart of FIG. 28. The ridge extracting and accentuating unit 15 has many functions which are common with the incipient ridge extracting and eliminating unit 13 and the pore extracting and eliminating unit 14.

In the ridge extracting and accentuating process, the insight that in the analysis of the incipient ridge feature executed in the process for extracting the incipient ridge, when there is no significant differences between the incipient ridge features of ridge lines arranged in the orthogonal direction of ridge lines, all the ridge lines are able to be judged to be true ridge lines, is used.

Also the insight that in the analysis of the pore feature executed in the process for extracting the pores, when there is no significant differences between the pore features of valley lines arranged in the orthogonal direction of ridge lines, all the valley lines are able to be judged to be true valley lines, is used.

At the time when the ridge extracting and accentuating process is started, the already-inputted fingerprint image and the already-extracted ridge direction data are stored in the data storing unit 42 of FIG. 4.

Figure 28:
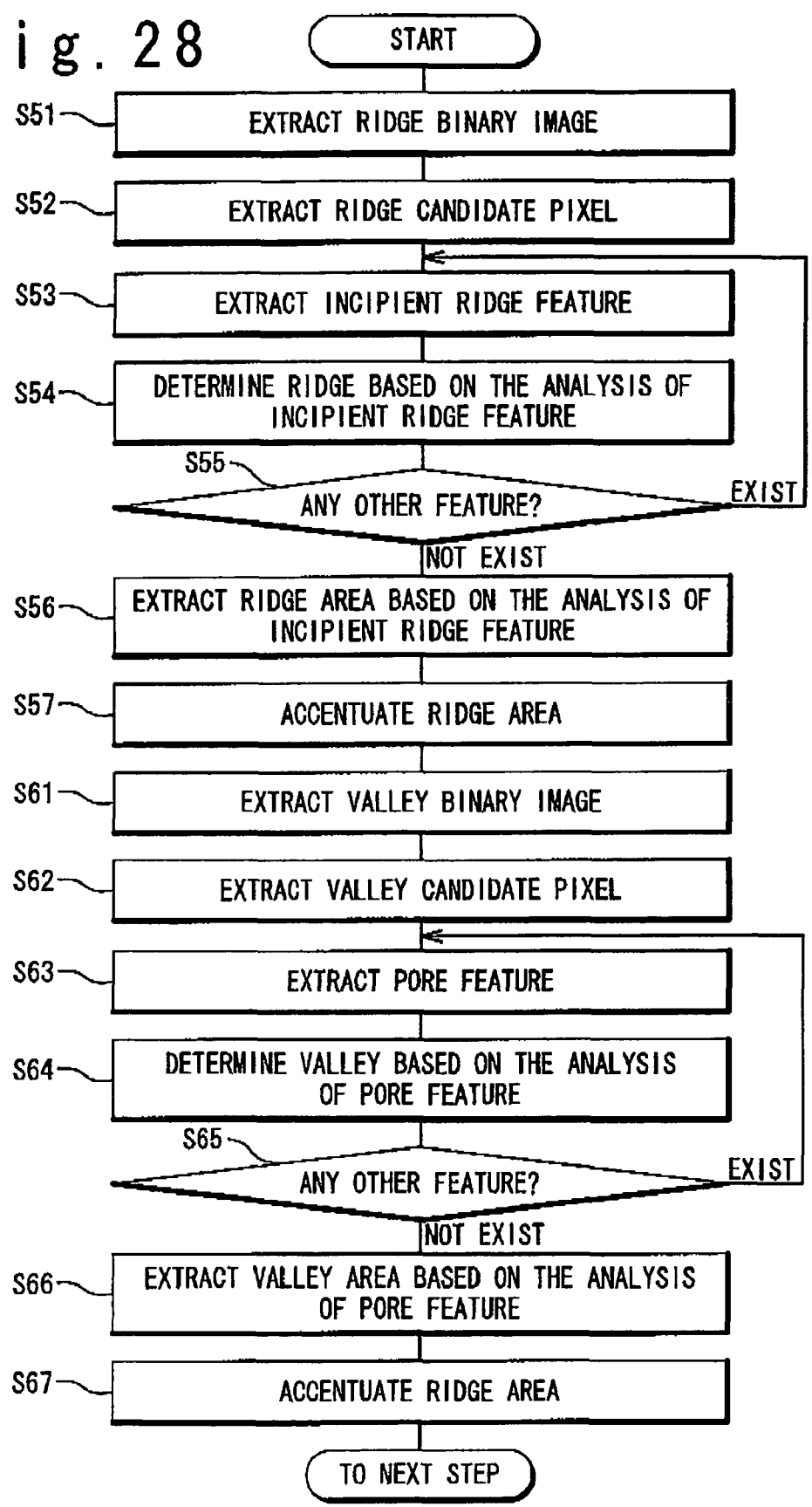
FIG. 28 is a flowchart of a ridge extracting and eliminating process.

At the step S51 of FIG. 28, the ridge binary image extracting unit 43 shown in FIG. 4 extracts the binary image in which the ridge portion is represented by "1" and the valley portion by "0". This digitalization process can be executed by applying the already explained method employed by the ridge binary image extracting unit 23 in the incipient ridge extracting and eliminating unit 13.

Next, at the step S52 of FIG. 28, the ridge candidate pixel extracting unit 44 shown in FIG. 4 converts the ridge binary image into the skeleton and consequently extracts the pixel group that which is supposed to be a candidate of the ridge. This process can be executed by applying the already explained method employed by the ridge candidate pixel extracting unit 24 in the incipient ridge extracting and eliminating unit 13.

Next, at the step S53 of FIG. 28, the incipient ridge feature extracting unit 45 shown in FIG. 4 extracts the incipient ridge feature, for each pixel in the incipient ridge candidate pixel group. This process can be executed by applying the already explained method employed by the incipient ridge feature extracting unit 25 in the incipient ridge extracting and eliminating unit 13.

Next, at the step S54 of FIG. 28, the incipient ridge feature analyzing unit 46 shown in FIG. 4 analyzes the incipient ridge feature extracted from the ridge candidate pixel group. This process can be executed by applying the already explained method employed by the incipient ridge feature analyzing unit 26 in the incipient ridge extracting and eliminating unit 13. However, the condition is set as follows.

When the ridge width is employed as the incipient ridge feature and all of the following conditional equations are satisfied, all of the ridges can be judged to be the true ridges. Here, the maximum value and minimum value of the incipient ridge features are defined as maxFA and minFA respectively. Also, the maximum value and minimum value of the ridge pitches are defined as maxP and minP respectively.

Condition 5: The condition for judging all of the ridges to be the true ridges,
1) minFA/maxFA>thD5
2) minP/maxP>thP
3) maxP<thx Here, thD5, thP and thX are the preset threshold parameters. From an actual fingerprint data, for example, thD5 is set to about 0.9, thP is set to about 0.65 and thX is set to about 20 for the proper judgment. The maximum pitch is set within the range appearing in the usual fingerprint (less than 20 pixels).

This condition implies that all of the ridges can be judged to be the true ridges, if (1) the ridge widths of the nearby ridges are substantially equal, (2) the differences of the pitches between adjacent ridges are small and (3) the maximum pitch is in the normal range. The mark of the true ridge is assigned to all of the ridge candidate pixels satisfying this condition.

This analysis is performed on all of the ridge candidate pixels. As the result of the analysis, the true-ridge mark or unclear mark is assigned to each of the all ridge pixels. This analysis result is stored in the data storing unit 42 through the data controlling unit 41, (5) Step S55

Next, at the step S55 of FIG. 28, the data controlling unit 41 of FIG. 4 monitors the progress of the extraction and analysis. When the extraction and analysis are finished for all of the preset incipient ridge features, the process from the step S56 is executed. When the extraction and analysis are not finished, namely, there are some incipient ridge features which are not analyzed yet, the process from the step S53 is executed again for the not-analyzed incipient ridge feature.

The other example of the incipient ridge feature defined by using the ridge direction density is explained below. In this case, the ridge direction density is extracted by the process explained from the step S53 of FIG. 28.

Next, at the step S54 of FIG. 28, the incipient ridge feature analyzing unit 56 shown in FIG. 4 analyzes the incipient ridge feature extracted from the ridge candidate pixel group.

The process when the ridge direction density is employed as the incipient ridge feature is similar to the case when the foregoing ridge width is employed as the incipient ridge feature. The conditional equations are also substantially equal. However, the threshold values are changed for its data property.

Condition 6: The condition for judging all of the ridges to be the true ridges,
1) minFA/maxFA>thD6
2) minP/maxP>thP
3) maxP<thX Here, thD6, thP and thX are the preset threshold parameters. From an actual fingerprint data, for example, thD6 is set to about 0.9, thP is set to about 0.65 and thX is set to about 20 for the proper judgment.

(6) Step S56

When the process for all of the incipient ridge features has been completed, the operational flow proceeds to the step S56 of FIG. 28. At the step S56, the ridge area extracting unit 47 shown in FIG. 4 analyzes the ridge candidate pixel group to which the true-ridge mark is assigned for extracting the ridge area. The ridge area extracting unit 47 traces about ±8 pixels in the ridge candidate pixel group from the remarked ridge candidate pixel to the ridge direction and counts the number of marks assigned to the respective pixels and then calculates the ratio of the number of the true-ridge mark against the number of all traced pixels (17 pixels).

If the ratio of the true-ridge mark is equal to or higher than a certain threshold, the remarked pixel is determined to be a true ridge pixel. It is proper that the threshold in this case is about 50%. This process is performed on all of the ridge candidate pixels.

Next, from each of the pixels determined as the true ridge (called 1st pixel), maximum of thx (which is a preset threshold parameter) pixels are traced on the right side in the direction orthogonal to the ridge. When the ridge candidate pixel (called 2nd pixel) is found on the tracing and the 2nd pixel is determined to be in true ridge line, the 1st pixel and the 2nd pixel are recognized to be in true ridges and a valley exists between the 1st pixel and the 2nd pixel.

We define here the 3rd, 4th and 5th pixels. Assume that the line connecting the 1st pixel and the 2nd pixel is divided into four pieces having equal length. By the division, 3 intermediate points are set. They are called 3rd, 4th and 5th pixels in order from the intermediate point nearest to the 1st point, respectively. Then, each of the pixels located between the 1st pixel and the 3rd pixel are determined as true ridge pixels. Each of the pixels located between the 5th pixel and the 2nd pixel are determined as true ridge pixels. Each of the pixels located between the 3rd pixel and the 5th pixel are determined as valley pixels (namely, white pixels). Next, the same process is also performed on the left side in the direction orthogonal to the ridge.

This process is performed on all of the ridge pixels. As a result, the pixel group determined as the ridge pixels or valley line pixels serves as the ridge area. The thus-extracted ridge area is stored in the data storing unit 42 through the data controlling unit 41.

(7) Step S57

Next, at the step S57 of FIG. 28, the ridge area density correcting unit 48 shown in FIG. 4 corrects the density value for the pixel group defined as the ridge area and consequently extracts the image where the ridge lines and the valley lines are enhanced. The emphasizing process employed by the ridge area density emphasizing unit 48 can be executed as already explained.

(1) Step S61

Next, at the step S61 of FIG. 28, the valley binary image extracting unit 49 shown in FIG. 4 extracts the binary image in which a valley line portion is represented by "1" and a ridge portion by "0". This digitalization process can be executed by applying the already explained method employed by the valley binary image extracting unit 33 in the pore extracting and eliminating unit 14.

(2) Step S62

Next, at the step S62 of FIG. 28, the valley candidate pixel extracting unit 50 shown in FIG. 4 converts the valley line binary image into a skeleton and consequently extracts the pixel group that is supposed to be a candidate of the valley line. The extraction can be executed by applying the already explained method employed by the valley candidate pixel extracting unit 34 in the pore extracting and eliminating unit 14.

(3) Step S63

Next, at the step S63 of FIG. 28, the pore feature extracting unit 51 shown in FIG. 4 extracts the sweat pore feature for each pixel in the valley candidate pixel group. This extraction process can be executed by applying the already explained method employed by the pore feature extracting unit 35 in the pore extracting and eliminating unit 14.

(4) Step S64

Next, at the step S64 of FIG. 28, the pore feature analyzing unit 52 shown in FIG. 4 analyzes the sweat pore feature extracted from the valley candidate pixel group. This extraction process can be executed by applying the already explained method employed by the pore feature analyzing unit 36 in the pore extracting and eliminating unit 14. However, the condition is set as follows.

When the ridge direction density is employed as the sweat pore feature and all of the following conditional equations are satisfied, all of the valley lines can be judged to be the true valley lines. Here, the maximum value and minimum value of the sweat pore features are defined as maxFA and minFA respectively. Also, the maximum value and minimum value of the valley line pitches are defined as maxP and minP.

Condition 7: The condition for judging that all of the valley lines are the true valley lines,
1) minFA/maxFA>thD7
2) minP/maxP>thP
3) maxP<thX Here, thD7, thP and thX are the preset threshold parameters. From an actual fingerprint data including five valley candidate lines, for example, thD7 is set to about 0.8, thP is set to about 0.65 and thX is set to about 20 for the proper judgment.

This condition implies that all of the valley lines can be judged to be the true valley lines, if (1) the ridge direction densities of the adjacent valley lines are substantially equal, (2) the differences of the pitches between adjacent valleys are small and (3) the maximum pitches between adjacent valleys is within 20 pixels. The mark of the true valley line is assigned to all of the valley candidate pixels satisfying this condition.

This analysis is performed on all of the valley candidate pixels. As the result of the analysis, the true-valley mark or unclear mark is assigned to each of the all valley line pixels. This analysis result is stored in the data storing unit 42 through the data controlling unit 41.

(5) Step S65

Next, at the step S65 of FIG. 28, the data controlling unit 41 of FIG. 4 monitors the progress of the extraction and analysis. When the extraction and analysis are finished for all of the preset sweat pore features, the process from the step S66 is executed. When the extraction and analysis are not finished, namely, there are some sweat pore features which are not analyzed yet, the process from the step S63 is executed again for the not-analyzed sweat pore feature.

The other example of the sweat pore feature defined by using the density difference accumulated value is explained below. In this case, the density difference accumulated value is extracted by the process from the step S63 of FIG. 28. The extraction process can be executed by applying the already explained method employed by the pore extracting and eliminating unit 14.

Next, at the step S64 of FIG. 28, the pore feature analyzing unit 52 shown in FIG. 4 analyzes the sweat pore feature extracted for the valley candidate pixel group.

Also, the process when the density difference accumulated value is employed as the sweat pore feature is substantially equal to the case when the foregoing ridge direction density is employed. The conditional equations are also substantially equal. However, the threshold values are changed for its data property.

Condition 8: The condition for judging all of the valley lines to be the true valley lines,
1) minFA/maxFA>thD8
2) minP/maxP>thP
3) maxP<thX Here, thD8, thP and thX are the preset threshold parameters. From an actual fingerprint data including five valley candidate lines, for example, thDS is set to be about 0.95, thP is set to be about 0.65 and thX is set to be 20 for the proper judgment.

(6) Step S66

When the process for all of the sweat pore features has been completed, the operation flow proceeds to the step S66 of FIG. 28. At the step S66, the valley area extracting unit 53 shown in FIG. 4 analyzes the valley candidate pixel group to which the true-valley mark is assigned, and then extracts the valley area.

The pixels in the valley candidate pixel group and ±8 pixels from the remarked valley candidate pixel in the direction of ridge line are traced and the number of marks assigned to the respective pixels are counted and the ratio of the number of the true-valley mark against the number of all traced pixels (17 pixels) is calculated.

If the ratio of the true-valley mark is equal to or higher than a certain threshold, the remarked pixel is determined to be a true valley pixel. It is proper that the threshold in this case is about 50%. This process is performed on all of the valley candidate pixels.

Next, from each of the pixels determined as the true valley (called 1st pixel), thX (which is a preset threshold parameter) pixels are traced on the right side in the direction orthogonal to the ridge. When the valley candidate pixel (called 2nd pixel) is found on the tracing and the 2nd pixel is determined to be in true valley line, the 1st pixel and the 2nd pixel are recognized to be in true valley lines and a ridge exists between the 1st pixel and the 2nd pixel.

We define here the 3rd, 4th and 5th pixels. Assume that the line connecting the 1st pixel and the 2nd pixel is divided into four pieces having equal length. By the division, 3 intermediate points are set. They are called 3rd, 4th and 5th pixels in order from the intermediate point nearest to the 1st point, respectively. Then, each of the pixels located between the 1st pixel and the 3rd pixel are determined as true valley pixels (namely, white pixels). Each of the pixels located between the 5th pixel and the 2nd pixel are determined as true valley pixels (white pixels). Each of the pixels located between the 3rd pixel and the 5th pixel are determined as ridge pixels (black pixels). Next, the same process is also performed on the left side in the direction orthogonal to the ridge.

This process is performed on all of the true valley pixels. As a result, the pixel group determined as the ridge pixels or valley line pixels serves as the valley area. The thus-extracted valley area is stored in the data storing unit 42 through the data controlling unit 41.

(7) Step S67

Next, at the step S67 of FIG. 28, the valley area density accentuating unit 54 shown in FIG. 4 corrects the density value for the pixel group defined as the valley line area and consequently extracts the image where the ridge and the valley lines are enhanced. The emphasizing process of the valley area density accentuating unit 54 can be executed by that of the ridge area density emphasizing unit 48. Since the operation of the valley area density accentuating unit 54 and the operation of the ridge area density emphasizing unit 48 are similar, the embodiment in which those two units are unified into a common unit (realized by a common hardware unit or a common software program) is easily constructed from the above explanation for those skilled in the art.

The reason why those two units are separated in this embodiment is that the former process of ridge extraction based on the incipient ridge feature analysis and the latter process of valley line extraction based on the sweat pore feature analysis can be configured independently of each other without any dependency relation. The image where the ridge lines and the valley lines are enhanced in this way is stored in the data storing unit 42 through the data controlling unit 41 and then sent to the minutia extracting unit 16. Here, the detailed explanation of the embodiment of the ridge extracting and accentuating unit is completed.

The process explained in the present embodiment can be applied not only to the fingerprint image but also to palmprint images. Generally the process can be applied to any kind of images having stripes the shapes of which are similar to the incipient ridge or the sweat pore.

Also, the present embodiment has been explained by using the ridge enhancing mask example and the various parameter examples under the assumption of the normally employed fingerprint image of 500 dpi. However, the above explained process can be adapted even for the fingerprint image scanned at a resolution other than 500 dpi by using the mask or parameter suitable for the resolution.

Also, even in the case of employing the other definition of feature quantity as the incipient ridge feature or the sweat pore feature, the incipient ridge line and the sweat pore can be recognized by extracting the pattern of the feature which is alternately varied in the direction orthogonal to the ridge.

Moreover, in another embodiment, a white pixel radius can be employed as the different sweat pore feature. This embodiment will be described below in detail with reference to FIGS. 29 to 31.

Figure 29:
FIG. 29 is a view showing a fingerprint where enlarged pores are thick.
Figure 30:
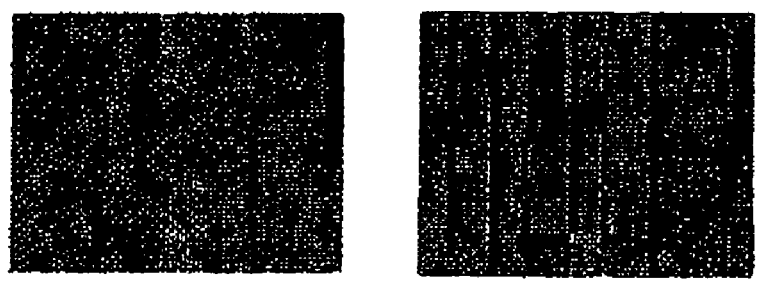
FIG. 30 is an enlarged view of enlarged pores and a view showing a valley candidate pixel.

FIG. 29 is an example of the fingerprint image. In this image, sweat pores are enlarged and the plurality of sweat pores are connected to form continuous sweat pore portions. This kind of continuous sweat pore portions tends to induce the erroneous extraction of false minutiae. The left side picture of FIG. 30 is the enlarged view of the ridge image including the enlarged pore, in the image where the focused area shown in FIG. 29 is cut away and rotated such that the direction orthogonal to the ridge becomes horizontal. On the right side of FIG. 30, the picture of the left side of FIG. 30 and the valley candidate pixel group are overlapped.

The white pixel radius is the feature for extracting the enlarged pore and indicates the size of a circle contained in the enlarged pore by its radius. For carrying out the calculation, the pixel group having the maximum density in the direction orthogonal to the ridge is extracted. At first, as an initial value, all of the pixels are set to be white pixels. Next, if the density value of a certain remarked pixel is the maximum or the second density value, in the pixel group including about 8 pixels from the remarked pixel to the right and left sides in the direction orthogonal to the ridge, the remarked pixel is defined to be black.

Figure 31:
FIG. 31 is a view showing a maximum density pixel group.

When such a process is performed on all of the pixels, the binary image where the pixels having the relatively high density in the direction orthogonal to the ridge are black pixels is generated. This binary image is referred to as the maximum density pixel group. FIG. 31 is the maximum density pixel group generated from the right side picture of FIG. 30.

Next, each pixel in the valley candidate pixel group is put on the image shown in FIG. 31, and a white pixel radius feature is extracted for each pixel of the valley candidate pixel group.

When the remarked pixel is defined as P drawn in FIG. 31, the maximum circle including only white pixels determined from the circle with the P as a center, and its radius is extracted as the white pixel radius.

In the fingerprint image where the enlarged pores are thick, the white pixel radius has the large value in the enlarged pore portion, and the value of the white pixel radius is relatively small in the true valley line portion.

In the case that the white pixel radius is employed as the sweat pore feature, whether the valley is a true valley or a sweat pore can be judged in accordance with the following condition. Here, the maximum value of the sweat pore features is defined as maxFA. The maximum value and minimum value of the odd-numbered sweat pore features are defined as maxFO and mini FO respectively. The maximum value and minimum value of the even-numbered sweat pore features are defined as maxFE and minFE respectively. Also, there are 4 pitches between the any adjacent two valley lines selected from total of 5 lines, and the maximum value and minimum value of the four pitches are defined as maxP and minP respectively.

Condition 9: The condition for judging that the odd-numbered valley line is true valley lines and the even-numbered valley line is sweat pore lines,
1) maxFO<minFE
2) (minFE−maxFO)/maxFA>thD9
3) minP/maxP>thP Here, thD9 and thP are the preset threshold parameters. From an actual fingerprint data, for example, thD9 is set to about 0.4 and thP is set to about 0.65 for the proper judgment.

Figure 32:
FIG. 32 is a view showing a sweat pore area.
Figure 33:
FIG. 33 is a view showing a sweat pore area density corrected pixel.

The right side of FIG. 32 shows the sweat pore area that is extracted from the image on the left side picture of FIG. 32 by using the white pixel radius as the sweat pore feature.

In the above mentioned embodiments, the conditional judgment is carried out only for a single incipient ridge feature or the sweat pore feature. However, another embodiment may be considered in which the conditions for the plurality of properties are judged by combining the logical sum or the logical product. In this case, the more accurate incipient ridge line extraction and sweat pore extraction can be attained with the appropriately set threshold parameters.

In the already explained embodiments, when analyzing the incipient ridge feature and the sweat pore feature, the five ridge candidates and valley line candidates are used as examples. However, those numbers are not limited to 5. As those numbers are increased, the more accurate incipient ridge line judgment and sweat pore judgment can be attained. In the viewpoint that the applicable region can be extracted from many places of the fingerprints, 5 to 7 candidate lines are suitable.

In the already explained embodiments, the system for recognizing fingerprint image may be attained by using computer sets connected to each other and each of which corresponds to the incipient ridge extracting and eliminating unit 13, the pore extracting and eliminating unit 14 and the ridge extracting and accentuating unit 15. Or, the system may be designed such that one computer set includes apparatuses, each of which corresponds to the fingerprint image inputting unit 11, the ridge direction extracting unit 12, the incipient ridge extracting and eliminating unit 13, the pore extracting and eliminating unit 14, the ridge extracting and accentuating unit 15, the minutia extracting unit 16 and the minutia outputting unit 17. Or, the system may be designed so as to instruct a computer by a computer program to execute the functions of the fingerprint image inputting unit 11, the ridge direction extracting unit 12, the incipient ridge extracting and eliminating unit 13, the pore extracting and eliminating unit 14, the ridge extracting and accentuating unit 15, the minutia extracting unit 16 and the minutia outputting unit 17.

The explained embodiments have the following features.

(1) The configuration for extracting the minutiae from a fingerprint image has a means for extracting the incipient ridge feature from the ridge and the incipient ridge; a means for analyzing the incipient ridge feature of some several ridges in the direction orthogonal to the ridge and judging the ridge to be the incipient ridge line when the incipient ridge feature pattern agrees with a preset condition; a means for extracting the incipient ridge area by using the ratio of the number of the pixels judged to be an incipient ridge line; and a means for correcting the pixel density inside the incipient ridge area.

(2) The configuration for extracting the minutiae from a fingerprint image has: a means for extracting the sweat pore feature from the valley line and the sweat pore line; a means for analyzing the sweat pore feature of the several valley lines in the direction orthogonal to the ridge and judging the pore to be the true sweat pore if the sweat pore feature pattern agrees with a preset condition; a means for extracting the sweat pore area by using the ratio of the number of the pixels judged to be a true sweat pore; and a means for correcting the pixel density within the sweat pore area.

(3) The configuration for extracting the minutiae from a fingerprint image has: a means for extracting the incipient ridge feature from the ridge; a means for analyzing the incipient ridge feature of several ridges in the direction orthogonal to the ridge and judging the ridge to be the true ridge if the incipient ridge feature pattern agrees with a preset condition; a means for extracting the ridge area by using the ratio of the number of the pixels judged to be a true ridge; and a means for emphasizing the pixel density within the ridge area.

(4) The configuration for extracting the minutiae from a fingerprint image has: a means for extracting the sweat pore feature from the valley line; a means for analyzing the sweat pore feature of the several valley lines in the direction orthogonal to the ridge and judging the valley to be the true valley line if the sweat pore feature pattern agrees with a preset condition; a means for extracting the valley line area by using the ratio of the number of the pixels judged to be a true valley line; and a means for emphasizing the pixel density within the valley line area.

(5) The ridge width is employed as the incipient ridge feature in the items (1) and (3).

(6) The ridge direction density is employed as the incipient ridge feature in the items (1) and (3).

(7) The ridge direction density is employed as the sweat pore feature in the items (2) and (4).

(8) The density difference accumulated value is employed as the sweat pore feature in the items (2) and (4).

(9) The white pixel radius is employed as the sweat pore feature in the items (2) and (4).

As mentioned above, according to the embodiment of the present invention, the system for improving the minutiae extraction accuracy having the configuration which is characterized by including; the means for accurately extracting and removing the incipient ridge line and the sweat pore, even for the fingerprint image that is difficult to identify the ridge because of the influences of the incipient ridge lines and the sweat pores, in the feature extracting function for the fingerprint image; and the means for extracting and emphasizing the ridge lines and the valley lines is provided.

When the fingerprint image having the thick incipient ridge lines is observed in the direction orthogonal to the ridge, the incipient ridge lines and the true ridge lines appear alternately. According to the embodiment of the present invention, a configuration is provided, by which the incipient ridge lines are accurately extracted and removed by using the method which extracts the incipient ridge feature, analyzes its appearance pattern and judges it in accordance with a preset condition.

Similarly, when the fingerprint image having the thick sweat pores is observed in the direction orthogonal to the ridge, sweat pore lines and true valley lines appear alternately. According to the embodiment of the present invention, a configuration is provided, by which the sweat pores are accurately extracted and removed by using the method which extracts the sweat pore feature, analyzes its appearance pattern and judges it in accordance with the preset condition.

Also according to the embodiment of the present invention, a configuration is provided, by which the true ridge lines can be accurately extracted by using the method that for the fingerprint image without any thick incipient ridge line, the incipient ridge feature is extracted, the incipient ridge features of the several ridge lines are analyzed in the direction orthogonal to the ridge line and the nonexistence of the significant difference between all of the incipient ridge features is judged in accordance with a preset condition.

Moreover, according to the embodiment of the present invention, a configuration is provided, by which the true valley lines can be accurately extracted by using the method that for the fingerprint image without any thick sweat pore, the pore feature is extracted, the pore features of the several valley lines are analyzed in the direction orthogonal to the ridge line and the nonexistence of the significant difference between all of the pore features is judged in accordance with a preset condition.

What is claimed is:

1. A system for recognizing a fingerprint ridge, the system comprising:
a ridge direction extracting unit configured to extract a longitudinal direction of a ridge from a fingerprint image;
a first false feature analyzing unit configured to classify a plurality of ridges into true ridges and incipient ridges based on an analysis of an incipient feature pattern of said plurality of ridges in a direction crossing to said longitudinal direction;
an incipient ridge density correcting unit configured to generate a corrected image data by approximating densities of pixels classified as said incipient ridges close to a density of a valley of said fingerprint image;

a true ridge area extracting unit configured to extract a true ridge area in which a rate of pixels belonging to said true ridge is higher than a predetermined condition as a true ridge area; and a true ridge accentuating unit configured to correct density of a pixel belonging to said true ridge area to a density of a pixel that is in a neighboring area and has a higher density, wherein said incipient feature pattern includes a width of each of said plurality of ridges, or an average value of densities of nearby pixels arranged in said longitudinal direction.

2. The system according to claim 1, wherein said incipient feature pattern includes a width of each of said plurality of ridges.

3. The system according to claim 1, wherein said incipient feature pattern includes an average value of densities of nearby pixels arranged in said longitudinal direction.

4. A method for recognizing a fingerprint ridge, the method comprising:

extracting a longitudinal direction of a ridge from a fingerprint image;

classifying a plurality of ridges into true ridges and incipient ridges based on an analysis of an incipient feature pattern of said plurality of ridges in a direction crossing to said longitudinal direction;

generating a corrected image data by approximating densities of pixels classified as said incipient ridges close to a density of a valley of said fingerprint image;

extracting a true ridge area in which a rate of pixels belonging to said true ridge is higher than a predetermined condition as a true ridge area; and correcting a density of a pixel belonging to said true ridge area to a density of a pixel that is in a neighboring area and has a higher density.

5. The method according to claim 4, further comprising:

extracting an area extending in said longitudinal direction in which an occupancy rate of said true ridges is higher than a predetermined condition as a ridge area; and accentuating said ridge area.

6. A non-transitory computer readable software product for executing a method for recognizing a fingerprint ridge, the method comprising:

extracting a longitudinal direction of a ridge from a fingerprint image;

classifying a plurality of ridges into true ridges and incipient ridges based on an analysis of a pattern of densities of said plurality of ridges in a direction crossing to said longitudinal direction; and generating a corrected image data by approximating densities of pixels classified as said incipient ridges close to a density of a valley of said fingerprint image, extracting a true ridge area in which a rate of pixels belonging to said true ridge is higher than a predetermined condition as a true ridge area; and correcting a density of a pixel belonging to said true ridge area to a density of a pixel that in a neighboring area and has a higher density.

7. The computer readable software product according to claim 6, the method further comprising:

extracting an area extending in said longitudinal direction in which an occupancy rate of said true ridges is higher than a predetermined condition as a ridge area; and accentuating said ridge area.

8. The system according to claim 1, wherein the direction crossing to said longitudinal direction is a direction orthogonal to said longitudinal direction.

* * * * *

UNITED STATES PATENT AND TRADEMARK OFFICE
CERTIFICATE OF CORRECTION

| | | |
|---|---|---|
| PATENT NO. | : 7,853,047 B2 | |
| APPLICATION NO. | : 11/500467 | |
| DATED | : December 14, 2010 | |
| INVENTOR(S) | : Hara | |

It is certified that error appears in the above-identified patent and that said Letters Patent is hereby corrected as shown below:

Column 1, Line 21: delete "hot" and insert -- not --

Column 19, Line 24: delete "±18" and insert -- ±8 --

Column 21, Line 33: delete "thx" and insert -- thX --

Column 22, Line 35: delete "thx" and insert -- thX --

Column 29, Line 8: in Claim 1, delete "correct" and insert -- correct a --

Column 30, Line 25: in Claim 6, delete "that" and insert -- that is --

Signed and Sealed this
Fourth Day of October, 2011

David J. Kappos
*Director of the United States Patent and Trademark Office*